(12) United States Patent
Kim et al.

(10) Patent No.: US 9,864,543 B2
(45) Date of Patent: *Jan. 9, 2018

(54) ELECTRONIC DEVICE AND COMMUNICATION METHOD

(71) Applicant: Samsung Electronics Co., Ltd., Suwon-si, Gyeonggi-do (KR)

(72) Inventors: Chansol Kim, Seoul (KR); Jong Tae Park, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,286

(22) Filed: Feb. 14, 2017

(65) Prior Publication Data

US 2017/0153841 A1    Jun. 1, 2017

Related U.S. Application Data

(63) Continuation of application No. 14/628,598, filed on Feb. 23, 2015, now Pat. No. 9,582,217.

(30) Foreign Application Priority Data

Feb. 24, 2014   (KR) .......................... 10-2014-0021414

(51) Int. Cl.
*G06F 12/00* (2006.01)
*G06F 3/06* (2006.01)
*G06F 17/30* (2006.01)

(52) U.S. Cl.
CPC .......... *G06F 3/0643* (2013.01); *G06F 3/0604* (2013.01); *G06F 3/0607* (2013.01); *G06F 3/0679* (2013.01); *G06F 3/0688* (2013.01); *G06F 17/30115* (2013.01)

(58) Field of Classification Search
CPC ..... G06F 3/0643; G06F 3/0607; G06F 3/0688
See application file for complete search history.

(56) References Cited

U.S. PATENT DOCUMENTS

| | | | |
|---|---|---|---|
| 5,761,426 A | * | 6/1998 | Ishizaki .................. G06F 15/17 709/221 |
| 7,093,031 B2 | | 8/2006 | Ray et al. |
| 7,558,907 B2 | | 7/2009 | Stern et al. |
| 7,634,585 B2 | | 12/2009 | Conley et al. |
| 7,840,716 B2 | | 11/2010 | Lin et al. |
| 7,962,792 B2 | | 6/2011 | Diggs et al. |
| 8,180,988 B2 | | 5/2012 | Kwon et al. |
| 8,285,899 B2 | | 10/2012 | He et al. |
| 8,429,395 B2 | | 4/2013 | Russell et al. |

(Continued)

*Primary Examiner* — John A Lane
(74) *Attorney, Agent, or Firm* — Harness, Dickey & Pierce, P.L.C.

(57) ABSTRACT

A communication method of an application processor includes generating a plurality of files; generating a file set channel by transmitting a first pattern of input/output (I/O) requests to a storage device, the I/O requests being I/O requests corresponding to files from among the plurality of files; and transmitting first bit data to the storage device via the file set channel, the first bit data being transmitted using file set signaling, the file set signaling including a second pattern of I/O requests corresponding to first files from among the plurality of files such that each file in the plurality of files represents a bit of the first bit data.

20 Claims, 20 Drawing Sheets

(56) References Cited

U.S. PATENT DOCUMENTS

| | | |
|---|---|---|
| 8,745,277 B2 | 6/2014 | Kan |
| 2005/0080936 A1 | 4/2005 | Ray et al. |
| 2007/0050418 A1 | 3/2007 | Lin et al. |
| 2007/0168564 A1 | 7/2007 | Conley et al. |
| 2008/0010326 A1 | 1/2008 | Carpenter et al. |
| 2008/0091878 A1 | 4/2008 | Stern et al. |
| 2009/0204853 A1 | 8/2009 | Diggs et al. |
| 2010/0153642 A1 | 6/2010 | Kwon et al. |
| 2010/0205373 A1 | 8/2010 | He et al. |
| 2010/0319050 A1 | 12/2010 | Russell et al. |
| 2011/0276578 A1* | 11/2011 | Allalouf ................ G06F 3/0604 707/755 |
| 2012/0303905 A1 | 11/2012 | Zhang et al. |
| 2013/0145106 A1 | 6/2013 | Kan |
| 2014/0082224 A1* | 3/2014 | Kim ...................... G06F 3/0659 710/5 |
| 2014/0153589 A1 | 6/2014 | Shimamura et al. |
| 2014/0258641 A1* | 9/2014 | Hooker ............... G06F 12/0862 711/137 |
| 2015/0347027 A1* | 12/2015 | Lu ........................ G06F 3/0611 711/103 |

\* cited by examiner

ELECTRONIC DEVICE AND COMMUNICATION METHOD

CROSS-REFERENCE TO RELATED APPLICATIONS

This U.S. non-provisional patent application is a continuation of U.S. application Ser. No. 14/628,598 filed on Feb. 23, 2015, which claims priority under 35 U.S.C. §119 to Korean Patent Application No. 10-2014-0021414 filed Feb. 24, 2014, the subject matter of each of which is hereby incorporated by reference.

BACKGROUND

One or more example embodiments of the inventive concepts relate to an electronic device, and more particularly, relate to a non-standard communication method of an electronic device.

Semiconductor memory devices may be classified into volatile semiconductor memory devices and nonvolatile semiconductor memory devices. The nonvolatile semiconductor memory devices may retain data stored therein even at power-off; on the other hand, data stored in the nonvolatile semiconductor memory device may be permanent or reprogrammable, depending upon the fabrication technology used. The nonvolatile semiconductor memory devices may be used for user data storage and program and microcode storage in a wide variety of applications in the computer, avionics, telecommunications, and consumer electronics industries.

SUMMARY

According to one or more example embodiments, a communication method of an application processor includes generating a plurality of files; generating a file set channel by transmitting a first pattern of input/output (I/O) requests to a storage device, the I/O requests being I/O requests corresponding to files from among the plurality of files; and transmitting first bit data to the storage device via the file set channel, the first bit data being transmitted using file set signaling, the file set signaling including a second pattern of I/O requests corresponding to first files from among the plurality of files such that each file in the plurality of files represents a bit of the first bit data.

According to example embodiments, a communication method of a storage device includes receiving, from a host, first input/output (I/O) requests corresponding to a plurality of files; recognizing a non-standard communication based on the first I/O requests received; receiving second I/O requests on the plurality of files from the host after recognizing the non-standard communication; and interpreting the second I/O requests as bit data transmitted from the host.

According to example embodiments, a communication method of a host including an application processor includes generating, at the application processor, a plurality of files; generating, at the application processor, a first pattern of input/output (I/O) requests such that the first pattern of I/O requests are recognizable by a storage device as a request to establish a file set channel between the host and the storage device, the first pattern of I/O requests being I/O requests corresponding to the plurality of files; establishing a file set channel between the host and the storage device by transmitting the first pattern of I/O requests to the storage device; generating, at the application processor, a second pattern of I/O requests such that each file in the plurality of files represents a bit of bit data, the second pattern of I/O requests being I/O requests corresponding to first files from among the plurality of files; and transmitting the bit data to the storage device via the file set channel by transmitting the second pattern to the storage device.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
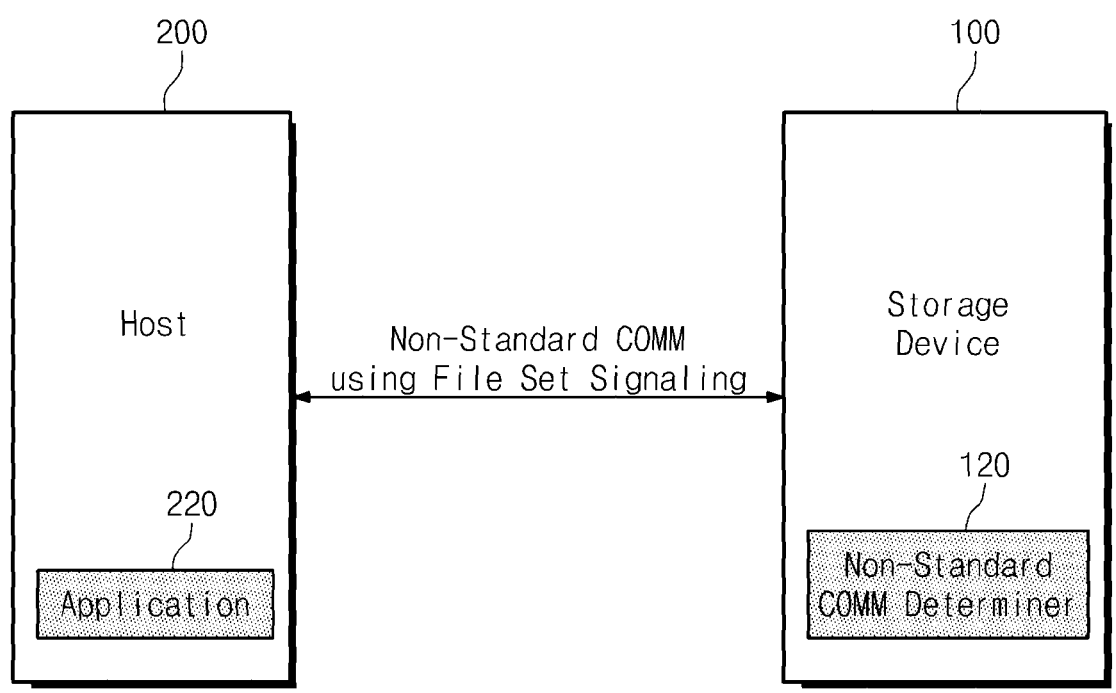
FIG. 1 is a block diagram schematically illustrating an electronic device for describing one or more example embodiments of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein. Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items. It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

An electronic device and a communication method according to at least one example embodiment of the inventive concepts may effectuate non-standard communication using file set signaling, regardless of hardware restriction and software restriction. Here, the hardware restriction may mean what may not be defined by the standard interface communication protocol of a storage device, and the software restriction may mean the situation where the standard protocol is not used due to a lack of the authority of a running application even through the standard protocol exists. Now will be described the file set signaling.

FIG. 1 is a block diagram schematically illustrating an electronic device 10 for describing one or more example embodiments of the inventive concepts. Referring to FIG. 1, an electronic device 10 includes a storage device 100 and a host 200. Each of the storage device 100 and the host 200 may include a processor. The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA). Further, according to one or more example embodiments of the inventive concepts, any or all the above-referenced processors may be implemented, for example, as a system on chip (SoC). All functions described herein as being performed by the storage device 100 or host 200 may be performed and/or controlled by the processors within the storage device 100 and the host 200, respectively.

The storage device 100 stores data to be used in the host 200. The storage device 100 incorporates a non-standard communication determiner 120 that determines non-standard communication based on input/output requests (e.g., write/read requests) for a plurality of files (hereinafter, referred to as a file set) from the host 200. The non-standard communication determiner 120 may be implemented any or all of hardware, software, and firmware forms. The non-standard communication determiner 120 recognizes a start of non-standard communication and converts the input/output requests for the file set input after the start of the non-standard communication. The non-standard communication determiner 120 converts bit data to be sent to the host 200 after the start of the non-standard communication into pass/fail of an input/output request for a file set.

The host 200 encompasses an application 220 for executing non-standard communication with the storage device 100. For example, the application 220 may be a magician program, which may be, for example, a program for managing, monitoring, improving and/or optimizing the storage device 100. The application 220 produces a plurality of files to generate/form a file set channel for non-standard communication and provides the storage device 100 with a specific pattern of input/output requests for the plurality of files, that is, a file set. The file set channel is formed if the non-standard communication determiner 120 recognizes a specific pattern of input/output requests.

In accordance with the description above, the electronic device 10 effectuates non-standard communication using the file set signaling. Here, the file set signaling may mean that each signal for input/output requests for each of files constituting a file set represent at least one bit that is transmitted from the host 200 to the storage device 100, or vice versa. That is, the host 200 sends bit data to the storage device 100 via the file set channel, and the storage device 100 transmits bit data to the host 200 via the file set channel.

Figure 2:
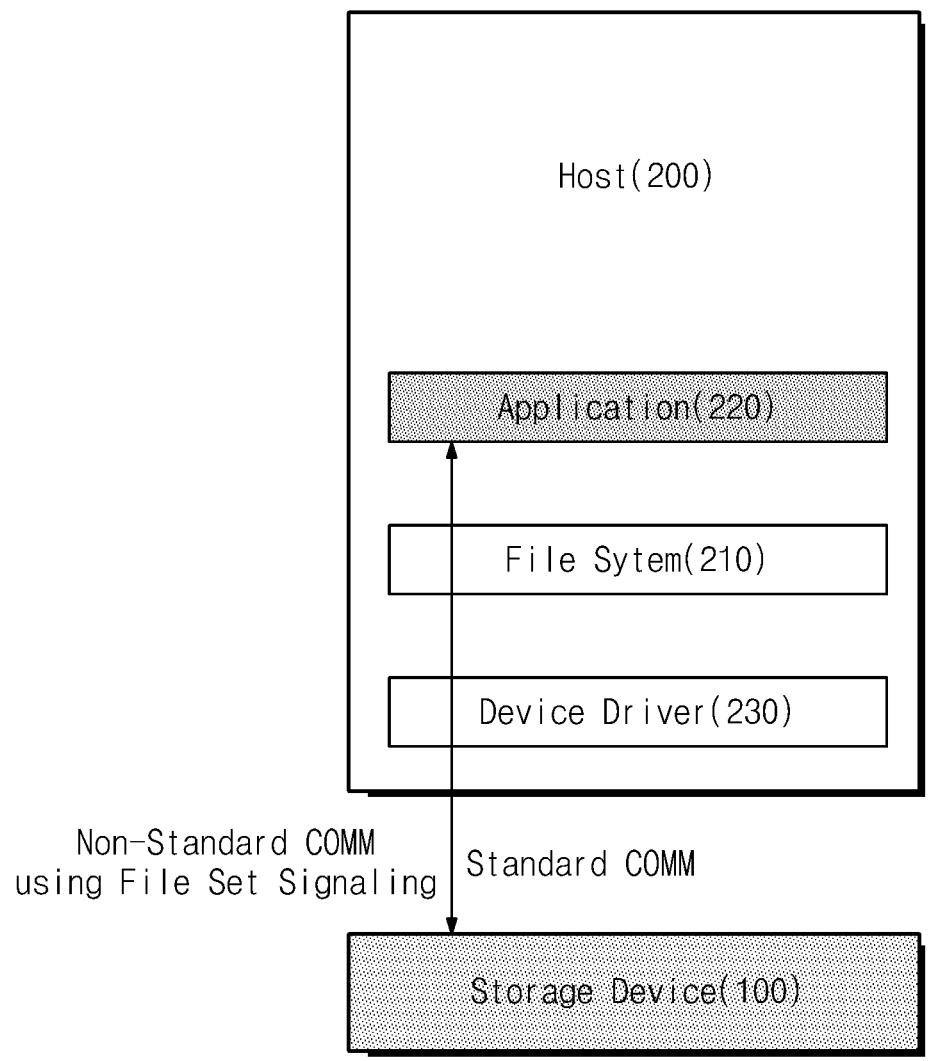
FIG. 2 is a diagram schematically illustrating software architecture for describing non-standard communication according to at least one example embodiment of the inventive concepts.

FIG. 2 is a diagram schematically illustrating software architecture for describing non-standard communication according to at least one example embodiment of the inventive concepts. Referring to FIG. 2, a host 200 includes a file system 210, an application 220, and a device driver 230.

The file system 210 may include, for example, any or all of an application programming interface (API), a file system manager, and a device interface. Upon non-standard communication, the file system 210 generates a plurality of files for forming a file set channel or input/output requests for the plurality of files according to a request of the application 220.

The device driver 230 provides the API for the file system 210 and converts an access request (e.g., an input/output request) on hardware a command which hardware (e.g., a storage device 100) can identify. The access request may be issued by the file system 210.

According to one or more example embodiments of the inventive concepts, the file system 210 and the device driver 230 are included in an Operating System (OS), and the application 220 is installed on the OS.

The non-standard communication according to one or more example embodiments of the inventive concepts is effectuated as follows. First, "file io api" in which the application 220 is implemented may issue a disk input/output request "disk io" to the storage device 100. Examples of the "file io api" include an api of CreateFile/ReadFile/WriteFile in a Windows operating system and api of open/read/write in a Linux operating system.

Next, a communication channel is configured between the application 220 and the storage device 100 by generating a plurality of files (or, a file set), a file input/output request "file io" on a part of the file set that the application 220 issues is generated, the file input/output request "file io" is converted into a disk input/output request "disk io" by the OS and the file system 210, and the disk input/output request "disk io" is sent to the storage device 100. The storage device 100 detects the disk input/output request "disk io" thus transmitted and determines a meaning of signals sent according non-standard communication. An example of non-standard communication involves using input/output read or write requests to transfer bits of data from the host 200 to the storage device 100, or vice versa.

Then, addresses of files may not be changed in a general situation after the file set is produced. A specific task such as defragmentation causes a logical block addressing (LBA) change, but it is not carried out in the situation where a file handle or descriptor is opened by the application 220. That an address is not changed after a file set is generated may mean that an address is not changed during file set signaling between the application 220 and the storage device 100, and may not mean that a logical block address is never changed.

Files to be used for the file set signaling may be irrelevant to whether the files have positions not related to each other, may not be stored but generated if necessary, and may be deleted after the non-standard communication. Files constituting a file set according to the file system 210 may not exist in a contiguous area. The file system 210 produces files constituting the file set by a cluster unit to allocate the files to the number of sectors where continuity is secured.

The file set channel may be formed with intent to obtain information on the same LBA between the application 220 and the storage device 100. The application 220 need not know a logical block address directly, even though the application 220 can know a file name via the file system 210. The storage device 100 can know a logical block address that a disk input/output request "disk io" issues and obtain a file name via analysis of a file system.

A manner of making a file set channel is a manner where a file input/output request "file io" with a specific pattern is issued from the application 220 with respect to N files constituting a communication channel and such a pattern is detected by a predetermined or, alternatively, desired storage device 100.

At least one example embodiment of the inventive concepts may support the non-standard communication using the file set signaling between the application 220 and the storage device 100.

In FIG. 2, the application 220 may effectuate the non-standard communication via the file system 210. However, one or more example embodiments of the inventive concepts are not limited thereto. For example, at least one example embodiment of the inventive concepts may be changed or modified such that the non-standard communication is additionally effectuated without passing through the file system 210.

Figure 3:
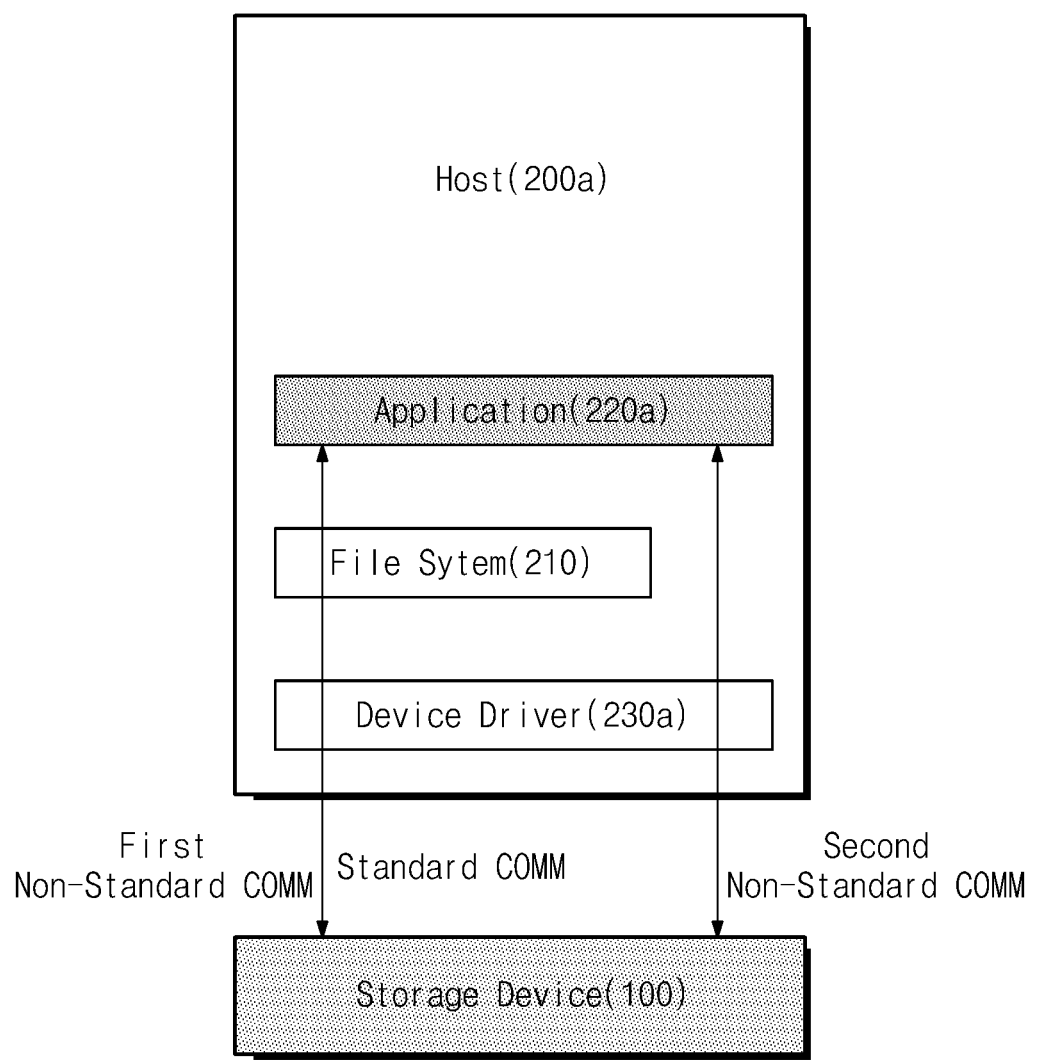
FIG. 3 is a diagram schematically illustrating software architecture according to one or more example embodiments of the inventive concepts.

FIG. 3 is a diagram schematically illustrating software architecture according to one or more example embodiments of the inventive concepts. Referring to FIG. 3, an application 220a may effectuate first non-standard communication via a file system 210, which uses a file set channel, and second non-standard communication via the file system 210, which does not use the file set channel. The first non-standard communication may be substantially the same as non-standard communication described with reference to FIG. 2, and a description thereof is thus omitted.

The second non-standard communication is performed by transmitting a command to a storage device 100 via a device driver 230a. According to one or more example embodiments of the inventive concepts, the device driver 230a may depend on an Operating System OS (e.g., Windows, Linux, MAC, Apple OS, Android, and so on).

The application 220a is configured to effectuate one of the first non-standard communication and the second non-standard communication. For example, the second non-standard communication is set to a default, and the first non-standard communication is performed when the second non-standard communication is not effectuated. In contrast, the first non-standard communication is set to a default, and the second non-standard communication is performed when the first non-standard communication is not effectuated.

An electronic device 10 according to at least one example embodiment of the inventive concepts may support the first non-standard communication using the file system 210 and the second non-standard communication not using the file system 210.

Figure 4:
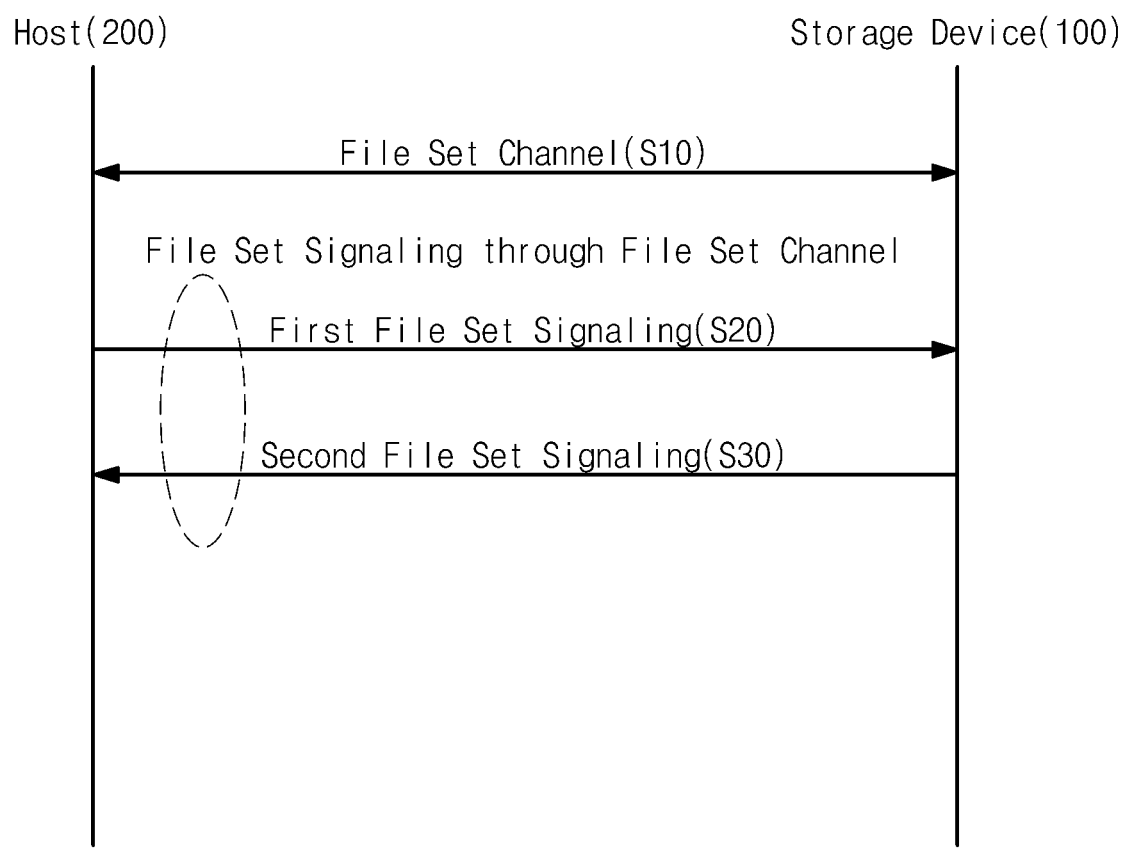
FIG. 4 is a diagram schematically illustrating the non-standard communication protocol using a file set channel, according to at least one example embodiment of the inventive concepts.

FIG. 4 is a diagram schematically illustrating the non-standard communication protocol using a file set channel, according to at least one example embodiment of the inventive concepts. Referring to FIGS. 1 to 3, when non-standard communication is required or, alternatively, desired, a host 200 generates a plurality of files and stores them in a storage device 100. The host 200 transmits a plurality of input/output requests with a predetermined or, alternatively, desired pattern on the plurality of files to the storage device 100, and the storage device 100 recognizes the plurality of input/output requests with the predetermined or, alternatively, desired pattern to form a file set channel for non-standard communication (S10).

After the file set channel is formed, the host 200 and the storage device 100 communicate with each other via first and second file set signaling. For example, the host 200 sends bit data to the storage device 100 via the first file set signaling (S20). Here, the first file set signaling may consist of input/output requests (e.g., read/write requests) for the plurality of files. At the first file set signaling, a read request or an update (or, write) request on a file is viewed as a bit. Also, the storage device 100 parses bit data based on the first file set signaling from the host 200. That is, input/output requests on the plurality of files transmitted from the host 200 may be parsed as bit data transferred from the host 200.

The storage device 100 transmits bit data to the host 200 via the second file set signaling (S30). Here, the second file set signaling may be formed of success/fail information corresponding to input/output requests for the plurality of files. However, one or more example embodiments of the inventive concepts are not limited thereto. For example, the second file set signaling may be variously formed of file related information. The host 200 parses bit data based on the second file set signaling from the storage device 100. For example, the storage device 100 may encode bit data (e.g., [01101100]) as a series of read success and/or read failure messages, and then send the read success and/or read failure messages to the host 200, which may decode the series of read success and/or read failure messages to determine the bit data sent from the storage device 100.

Now a non-standard communication method using a read request will be described with reference to FIGS. 5 to 7.

Figure 5:
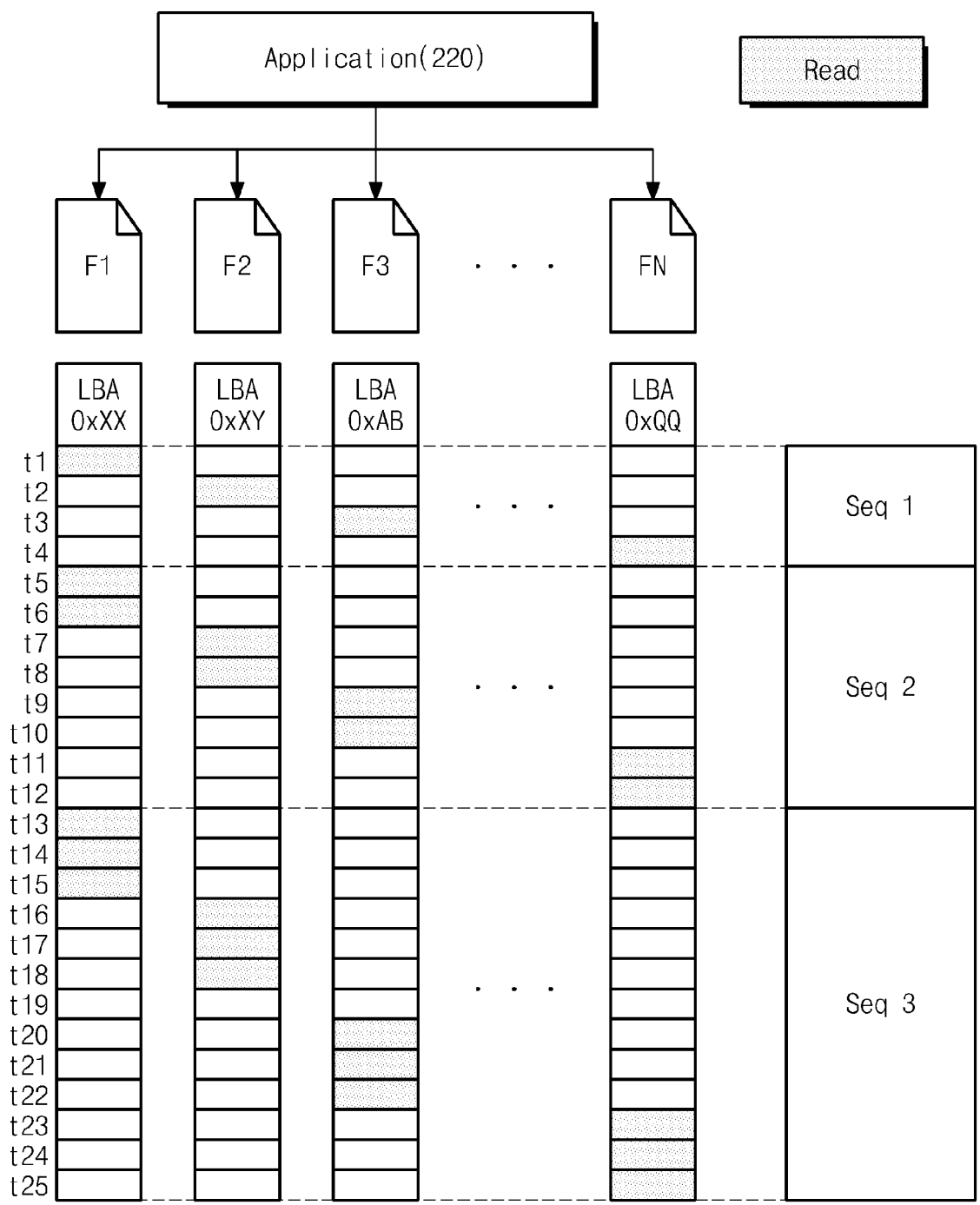
FIG. 5 is a diagram schematically illustrating the process of generating a file set channel using a read request, according to at least one example embodiment of the inventive concepts.

FIG. 5 is a diagram schematically illustrating the process of generating a file set channel using a read request, according to at least one example embodiment of the inventive concepts. For example, the shaded blocks in FIG. 5 may represent read requests issued from the host 200 to the data storage device 100. Blank blocks in FIG. 5 may indicate instances in which no read request is sent for a particular file. Vertical positions of the blocks illustrated in FIG. 5 represent a points in time (i.e., t1-tn) to which the blocks correspond, where 'n' is a positive integer.

Referring to FIG. 5, a storage device 100 groups and stores logical block addresses OxXX, OxYY, OxAB . . . OxQQ of N files F1 to FN and disk input/output requests "disk io" corresponding to the logical block addresses. For example, the storage device 100 may group and store the number of read requests generated, respectively, for logical block addresses OxXX, OxYY, OxAB . . . OxQQ of N files F1 to FN.

For example, during a first sequence Seq1, the storage device 100 stores (LBA1, 1), (LBA2, 1) . . . (LBAN, 1). During a second sequence Seq2, the storage device 100 stores (LBA1, 1, 2), (LBA2, 1, 2) . . . (LBAN, 1, 2). During a third sequence Seq3, the storage device 100 stores (LBA1, 1, 2, 3), (LBA2, 1, 2, 3) . . . (LBAN, 1, 2, 3).

In non-standard communication determiner 120 (refer to FIG. 1) of the storage device 100, a file set channel is formed when a file set that has been successfully recognized exists up to the third sequence Seq3.

Also, an application 220 (refer to FIG. 1) checks whether a file set channel is formed successfully after the sequences Seq1 to Seq3. Here, whether a file set channel is formed successfully may be checked according to transmitting and receiving of file set signaling which will be described later.

At least one example embodiment of the inventive concepts may include forming and/or generating a file set channel by recognizing a specific pattern of read requests for a file set.

Figure 6:
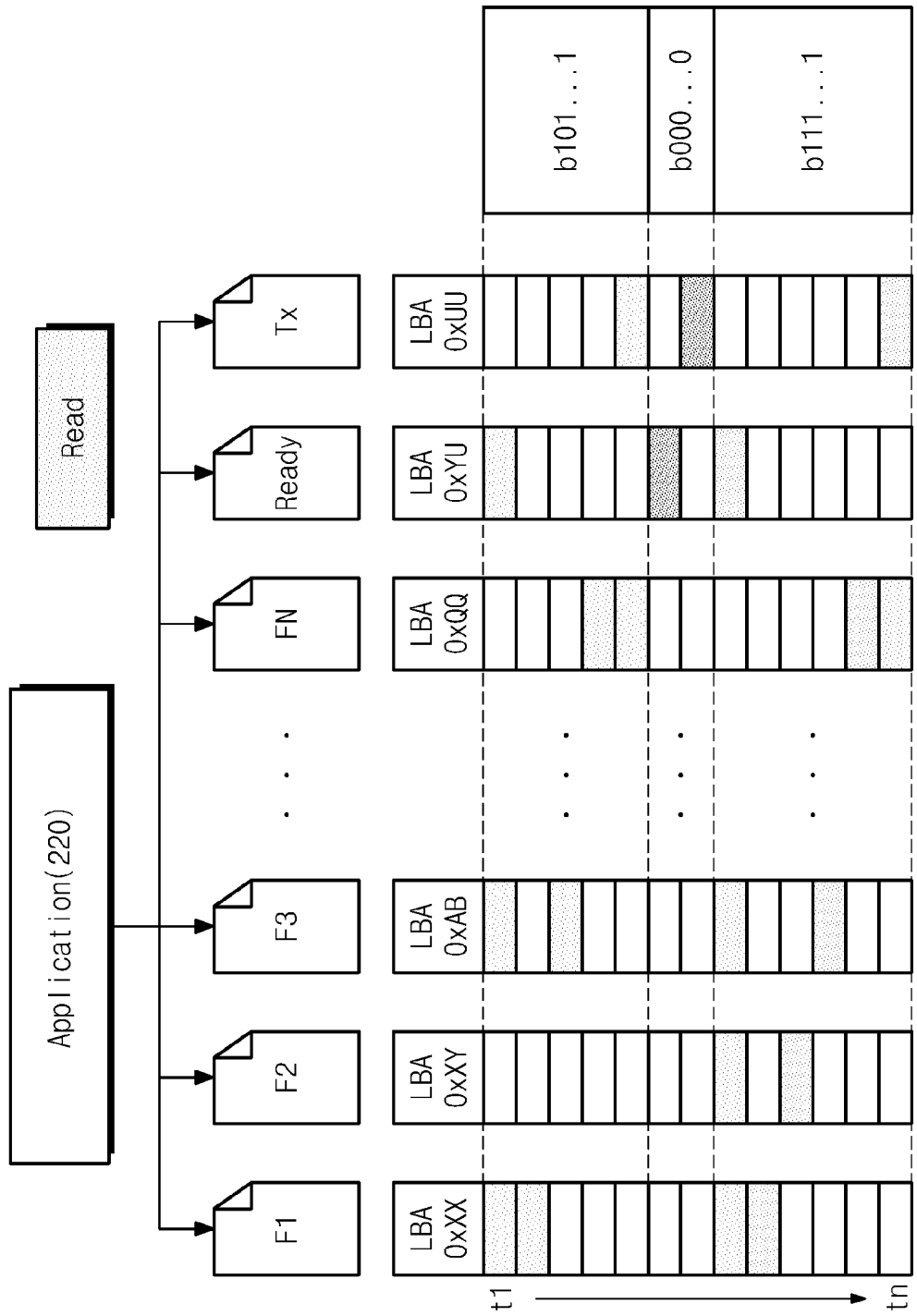
FIG. 6 is a diagram showing a process of effectuating transmitting of file set signaling using a read request, according to at least one example embodiment of the inventive concepts.

FIG. 6 is a diagram showing a process of effectuating transmitting of file set signaling using a read request, according to at least one example embodiment of the inventive concepts. For example, the shaded blocks in FIG. 6 may represent read requests issued from the host 200 to the data storage device 100. Blank blocks in FIG. 6 may indicate instances in which no read request is sent for a particular file. Vertical positions of the blocks illustrated in FIG. 6 represent a points in time (i.e., t1-tn) to which the blocks correspond, where 'n' is a positive integer.

Referring to FIG. 6, in case of data transmission, an application 220 generates (N+2) files, and the application 220 and the storage device 100 may recognize addresses of the (N+2) files. Here, locations of the files thus generated need not be continuing. Locations on the files thus generated may not be restricted.

N files F1 to FN are used as a bit line for transmitting bit data, and the remaining two files Ready and Tx are used to transmit data set to the bit line. The application 220 issues a disk input/output request "disk io" via a read request read on each file.

According to one or more example embodiments, an input/output request "disk io" is made by the host 200 with respect to the file Ready in order to inform the storage device 100 that the host 200 is ready to transmit a signal via non-standard communication. For example, according to one or more example embodiments of the inventive concepts, when the storage device 200 transmits a particular input/output command to the storage device 200 (e.g., a read request) for a particular file (e.g., the 'Ready' file), the host 200 is signaling to the storage device 100 that the host 200 is ready to begin non-standard communication, and the storage device 100 interprets the signaling as an indication that the host 200 is ready to begin non-standard communication.

A disk input/output request "disk io", that is, a read request on files for a bit set of the files F1 to FN is issued. At this time, a storage device 100 stores files where the disk input/output request "disk io" is issued. Signal transmission is reported by issuing a disk input/output request "disk io" for the file Tx. The storage device 100 views each file associated with the disk input/output request "disk io" as a bit. That is, the files are viewed as binary data (b101 . . . 1, (b000 . . . 0, and (b111 . . . 1. At this time, N-bit, or (N+2)-bit, data is transferred by issuing a disk input/output request "disk io" for a file set once. For example, according to one or more example embodiments of the inventive concepts, when the storage device 200 transmits a particular input/output command to the storage device 200 (e.g., a read request) for a particular file (e.g., files F1-FN file), the host 200 is signaling to the host 200 is sending bits of data to the storage device 100 as input/output signals, and the storage device 100 interprets the signaling as bits of data being sent via non-standard communication. For example, sending a consecutive series of commands including a read request for file F1, no read request for file F2, a read request for file F3, and no read request for file F4 may be interpreted as bit data (b1010) when the host 200 and storage device 100 are configured to interpret read requests as corresponding to the bit '1', and the absence of read requests as corresponding to the bit '0'. Further, according to one or more example embodiments of the inventive concepts, when the storage device 200 transmits a particular input/output command to the storage device 200 (e.g., a read request) for a particular file (e.g., the 'Tx' file), the host 200 is signaling to the storage device 100 that the host 200 is about to send, is currently sending or, alternatively, has completed sending bits of data via non-standard communication, and the storage device 100 interprets the signaling as an indication that the host 200 is about to send, is currently sending or, alternatively, has completed sending bits of data via non-standard communication.

For example, as illustrated in FIG. 6, a read request for files Ready, F1 to FN, and Tx is issued to transmit first bit data (b101 . . . 1. For example, a read request read on files Ready and Tx is issued by transmit second bit data (b000 . . . 0. For example, a read request read for files Ready, F1 to FN, and Tx is issued by transmit second bit data (b111 . . . 1. As is discussed above, according to one or more example embodiments, the host 200 and storage device 100 may be configured such that, with respect to a non-standard communication, a read request corresponds to the bit '1', and the absence of a read request corresponds to the bit '0'.

Meanwhile, a method of setting a bit '0' or '1' shown in FIG. 6 is illustrated as an example. According to one or more example embodiments, instead of using the bits '0' and '1' to refer to data that is not read requested and data that is read requested, respectively, a bit '0' may be assigned to a file that is read requested, and a bit '1' may be assigned to a file that is not read requested.

A file set signaling-based transmission method according to at least one example embodiment of the inventive concepts may transmit data by expressing whether a read request on a file set exists, with a bit.

Figure 7:
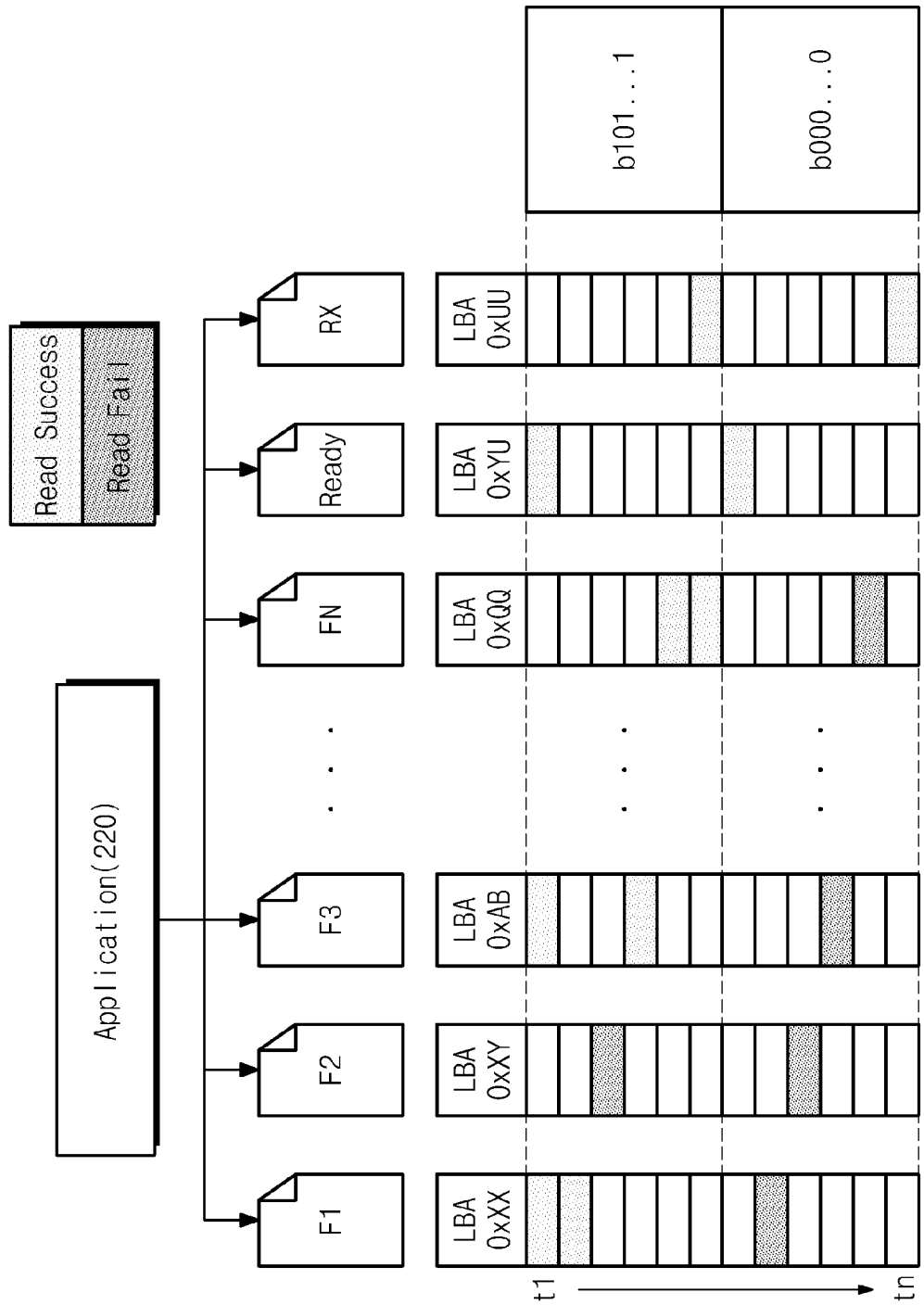
FIG. 7 is a diagram schematically illustrating a method of effectuating receiving of file set signaling using a read request, according to at least one example embodiment of the inventive concepts.

FIG. 7 is a diagram schematically illustrating a method of effectuating receiving of file set signaling using a read request, according to at least one example embodiment of the inventive concepts. For example, the light shaded blocks in FIG. 7 may represent read success indications issued from the data storage device 100 to the host 200, and the dark shaded blocks in FIG. 7 may represent read failure indications issued from the data storage device 100 to the host 200. Blank blocks in FIG. 7 may indicate instances in which no indication is sent for a particular file. Vertical positions of the blocks illustrated in FIG. 7 represent a points in time (i.e., t1-tn) to which the blocks correspond, where 'n' is a positive integer.

A start of reception of file set signaling is informed by transmitting a signal, directing a success of a read request, from the storage device 100 to an application 220. For example, the storage device 100 may send, to the host 200, a disk input/output request "disk io" to a logical block address corresponding to a file Ready.

The application 220 receives, from a storage device 100, signals designating whether a read request on files F1 to FN is successful. For example, sending a consecutive series of success/failure information including a read success indication for file F1, no indication or a read failure indication for file F2, a read success indication for file F3, and no indication or a read failure indication for file F4 may be interpreted as bit data (b1010) when the host 200 and storage device 100 are configured to interpret read success indications as corresponding to the bit '1', and no indication or a read failure indication as corresponding to the bit '0'. For example, the storage device 100 sends a bit '1' to the application 220 via non-standard communications by indicating that a read request succeeded for a particular file. In contrast, the storage device 100 sends a bit '0' to the application 220 via non-standard communications by indicating that a read request failed for the particular file. The application 220 determines success/fail of the disk input/output request "disk io" using a return value of a "file io api" of OS. According to one or more example embodiments of the inventive concepts, the application 220, as illustrated in FIG. 7, constructs bit data (b101 . . . 1 and (b000 . . . 0) by combining indexes of files of which a file input/output request "file io" succeeds. Afterwards, as the application 220 receives a signal designating success of a disk input/output request "disk io" for a file Rx, an operation of effectuating receiving of file set signaling is completed.

A file set signaling-based reception method according to at least one example embodiment of the inventive concepts may receive data by expressing whether a read request on a file set succeeds, with a bit.

Meanwhile, non-standard communication using a read request has been described with reference to FIGS. 5 to 7. One or more example embodiments of the inventive concepts are applicable to non-standard communication using a write request.

Figure 8:
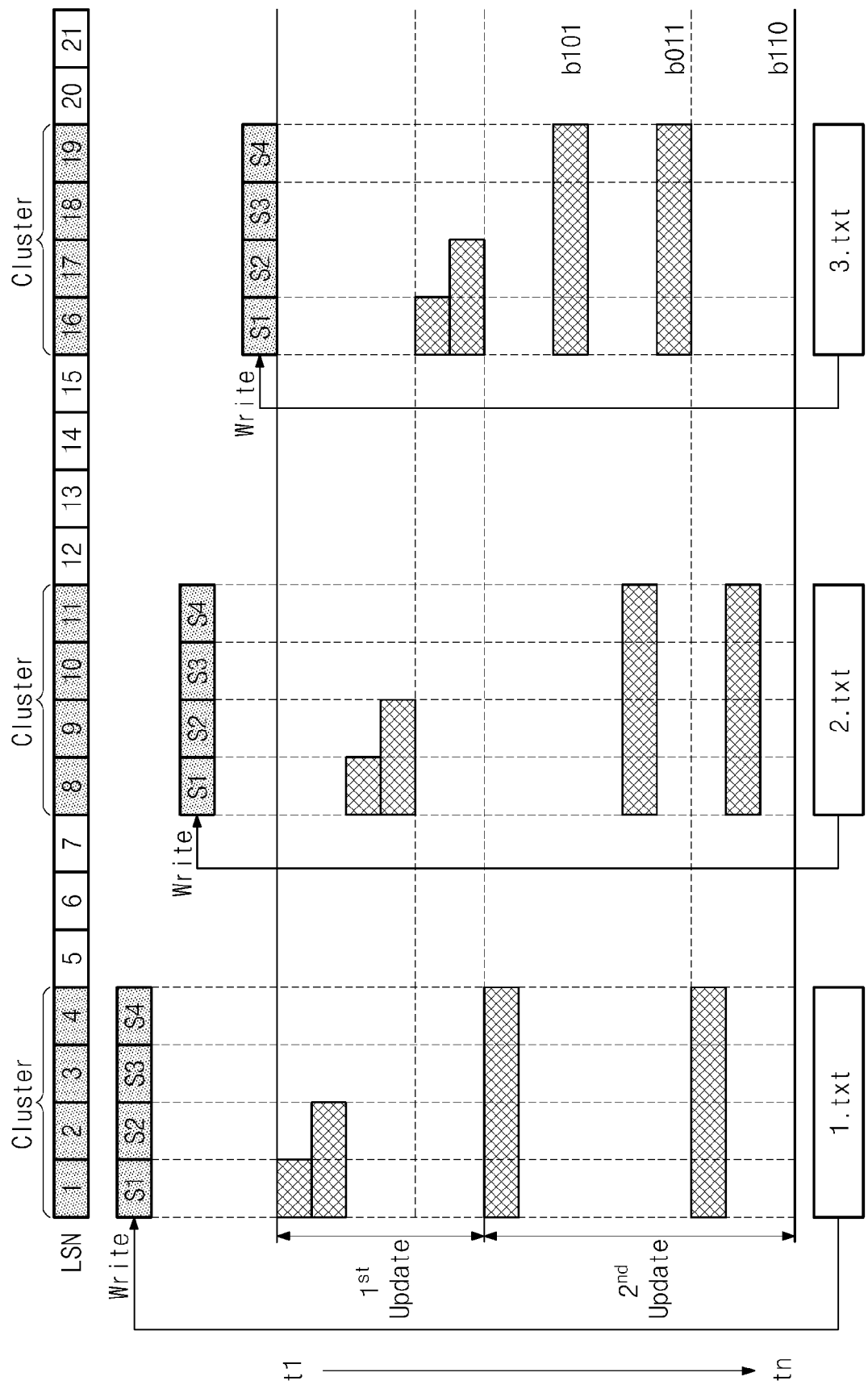
FIG. 8 is a diagram schematically illustrating non-standard communication using a write request, according to at least one example embodiment of the inventive concepts.

FIG. 8 is a diagram schematically illustrating non-standard communication using a write request, according to at least one example embodiment of the inventive concepts. For ease of description, it is assumed that non-standard communication shown in FIG. 8 uses three text files 1.txt, 2.txt, and 3.txt each of which is stored in a storage device 100 by the cluster. Here, each cluster is formed of a plurality of sectors indicated by logical sectors numbers (LSNs) illustrated in FIG. 8. For ease of description, it is assumed that a cluster is formed of four sectors. For example, the shaded blocks in FIG. 8 may represent write update requests issued from the host 200 to the data storage device 100 for a corresponding file or logical sector number. Blank blocks in FIG. 8 may indicate instances in which no write update request is sent for a corresponding file or logical sector number. Vertical positions of the blocks illustrated in FIG. 8 represent a points in time (i.e., t1-tn) to which the blocks correspond, where 'n' is a positive integer.

Returning to FIG. 8, non-standard communication using a write request effectuates transmission of file set signaling by forming a file set channel through a first update operation after storing of the files 1.txt, 2.txt, and 3.txt and carrying out a second update operation.

The transmission of file set signaling will now be described below. When an application 220 of a host 200 (refer to FIG. 1) wants to effectuate non-standard communication with a storage device 100, the application 220 requests generation of the files 1.txt, 2.txt, and 3.txt to a file system 210 (refer to FIG. 1). The file system 210 generates the files 1.txt, 2.txt, and 3.txt based on a request for the files 1.txt, 2.txt, and 3.txt of the application 220 and requests generation of corresponding write requests to a device driver 230 (refer to FIG. 2). Generation of the files 1.txt, 2.txt, and 3.txt may include allocation of logical addresses of the files 2.txt, and 3.txt. The device driver 230 issues and transmits write requests, which the storage device 100 can recognize, based on a request of the file system 210. Thus, the storage device 100, which receives a write request for each of the files 1.txt, 2.txt, and 3.txt from the device driver 230, may recognize logical addresses of the files 1.txt, 2.txt, and 3.txt.

Afterwards, a first update operation is carried out to generate a file set channel. During the first update operation, the application 220 issues an update request for each of the files 1.txt, 2.txt, and 3.txt with a specific pattern. The storage device 100 effectuates non-standard communication via the file set channel by recognizing the first update request. Here, the file set channel may include the files 1.txt, 2.txt, and 3.txt.

Next, a second update operation is performed for transmission of file set signaling. For example, a bit '1' is assigned to a file to be updated, and a bit '0' is set to a file not to be updated.

For example, sending a consecutive series of update requests including an update request for file 1.txt, no update request for file 2.txt, and an update request for file 3.txt, may be interpreted as bit data (b101), as illustrated in FIG. 8 when the host 200 and storage device 100 are configured to interpret update requests for a particular file as corresponding to the bit '1', and no update requests for a particular file as corresponding to the bit '0'. The host 200 may communicate bit data (b011) and (b110) in a similar manner as is also shown in FIG. 8.

In FIG. 8, an extension of the files 1.txt, 2.txt, and 3.txt may be "txt". However, one or more example embodiments of the inventive concepts are not limited thereto.

At least one example embodiment of the inventive concepts may effectuate a transfer of file set signaling using a bit indicating whether an update operation on a file set is required.

FIG. 8 illustrates an example of an update operation on a cluster unit forming files 1.txt, 2.txt, and 3.txt for transmission of file set signaling. However, one or more example embodiments of the inventive concepts are not limited thereto. For example, at least one example embodiment of the inventive concepts may be modified or changed such that an update operation is performed on at least one sector of a cluster forming files 1.txt, 2.txt, and 3.txt for transmission of file set signaling.

Figure 9:
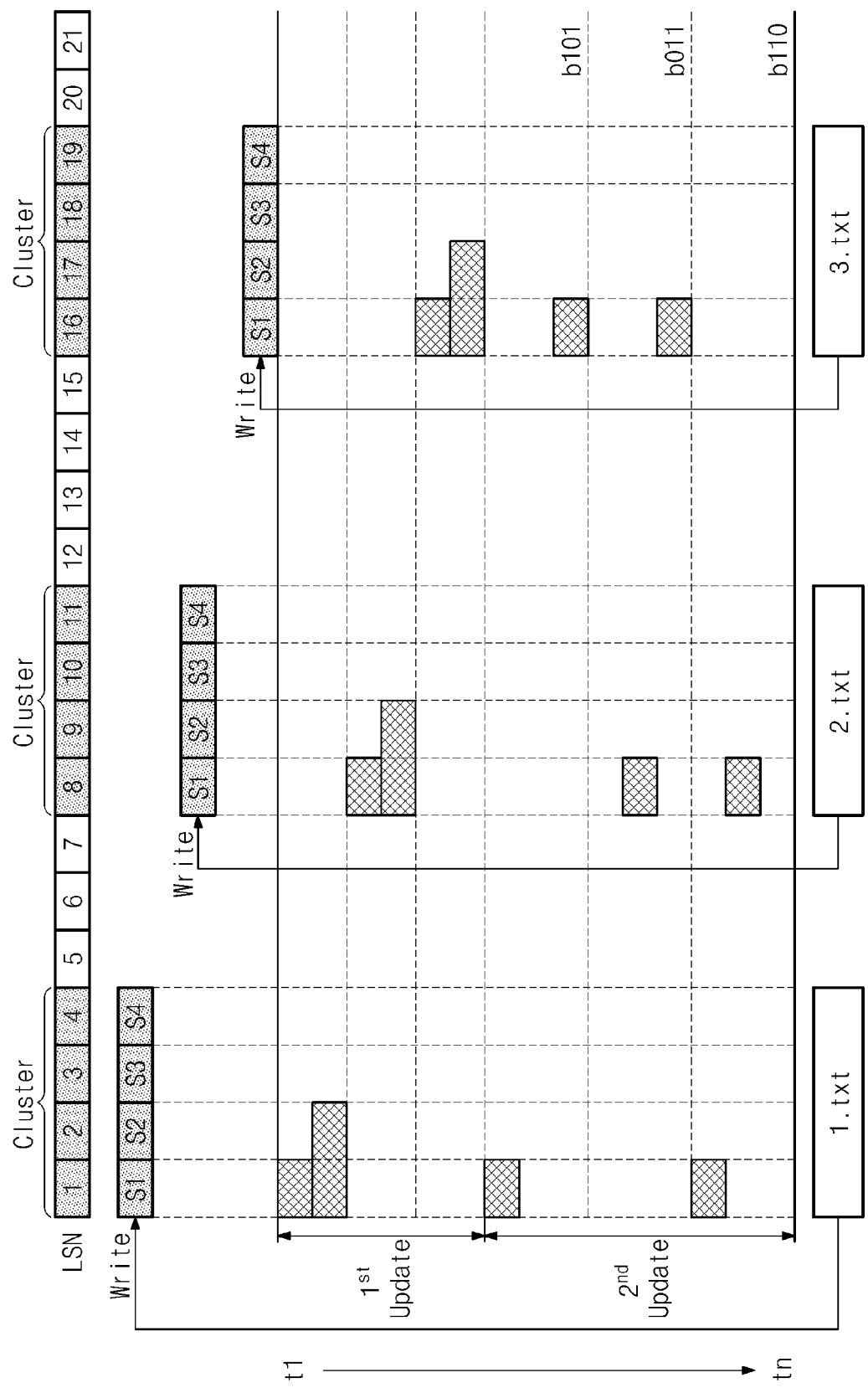
FIG. 9 is a diagram schematically illustrating non-standard communication using a write request, according to one or more example embodiments of the inventive concepts.

FIG. 9 is a diagram schematically illustrating non-standard communication using a write request, according to one or more example embodiments of the inventive concepts. Referring to FIG. 9, a non-standard communication method is different from that of FIG. 8 in that a second update operation on only one sector of a cluster forming files 1.txt, 2.txt, and 3.txt is carried out for transmission of file set signaling. For example, the shaded blocks in FIG. 9 may represent write update requests issued from the host 200 to the data storage device 100 for a corresponding file or logical sector number. Blank blocks in FIG. 9 may indicate instances in which no write update request is sent for a corresponding file or logical sector number. Vertical positions of the blocks illustrated in FIG. 9 represent points in time (i.e., t1-tn) to which the blocks correspond, where 'n' is a positive integer.

In FIGS. 8 and 9, there is described an example in which 1-bit data is transferred using each of files 1.txt, 2.txt, and 3.txt. However, one or more example embodiments of the inventive concepts are not limited thereto. For example, n-bit data (n being an integer of 2 or more) may be transmitted through each of the files 1.txt, 2.txt, and 3.txt. For example, sending a consecutive series of update requests including an update request for sector 1 of file 1.txt, no update request for file 2.txt, and an update request for sector 1 of file 3.txt, may be interpreted as bit data (b101), as illustrated in FIG. 9 when the host 200 and storage device 100 are configured to interpret update requests for a particular file as corresponding to the bit '1', and no update requests for a particular file as corresponding to the bit '0'. The host 200 may communicate bit data (b011) and (b110) in a similar manner as is also shown in FIG. 9.

Figure 10:
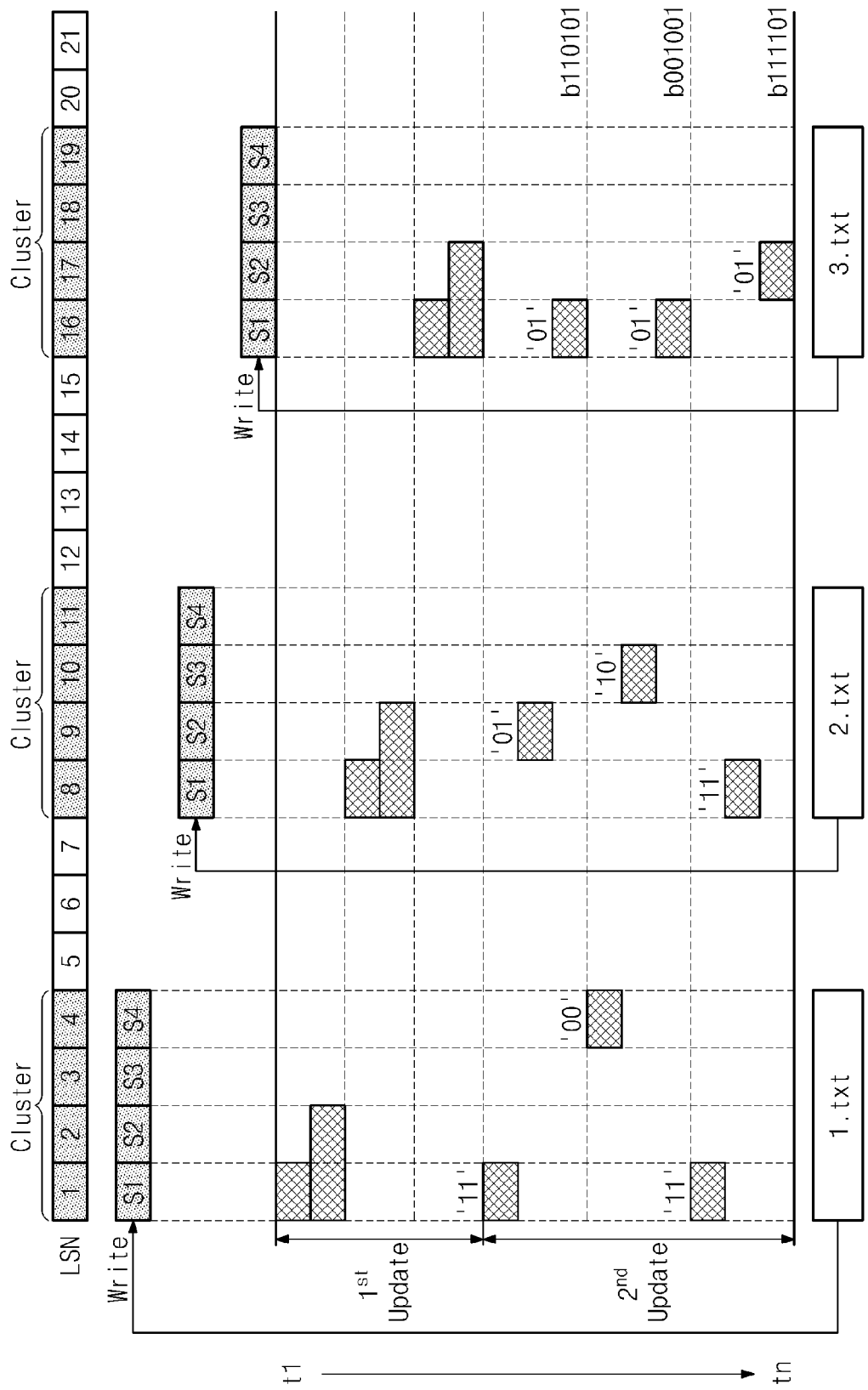
FIG. 10 is a diagram schematically illustrating non-standard communication using a write request, according to one or more example embodiments of the inventive concepts.

FIG. 10 is a diagram schematically illustrating non-standard communication using a write request, according to one or more example embodiments of the inventive concepts. Referring to FIG. 10, a non-standard communication method is different from those of FIGS. 8 and 9 in that a second update operation is carried out to transmit 2-bit data via each of files 1.txt, 2.txt, and 3.txt. For example, the shaded blocks in FIG. 10 may represent write update requests issued from the host 200 to the data storage device 100 for a corresponding file or logical sector number. Blank blocks in FIG. 10 may indicate instances in which no write update request is sent for a corresponding file or logical sector number. Vertical positions of the blocks illustrated in FIG. 10 represent points in time (i.e., t1-tn) to which the blocks correspond, where 'n' is a positive integer.

As illustrated in FIG. 10, a cluster is formed of four sectors S1 to S4. Two bits of each of the sectors S1 to S4 are set to different values at an update operation. For example, during an update operation, a value of the first sector S1 is set to "11", a value of the second sector S2 to "01", a value of the third sector S3 to "10", and a value of the fourth sector S4 to "00". For example, sending a consecutive series of update requests including an update request for sector S1 of file 1.txt, an update request for sector 2 of file 2.txt, and an update request for sector 1 of file 3.txt, may be interpreted as bit data (b110101), as illustrated in FIG. 10, when the host 200 and storage device 100 are configured to interpret update requests for a particular file as corresponding to specific pairs of bits in the manner described above. The host 200 may communicate bit data (b001001) and (111101) in a similar manner as is also shown in FIG. 10.

A non-standard communication method according to at least one example embodiment of the inventive concepts may transmit 2-bit data through each of the les 1.txt, 2.txt, and 3.txt.

As described above, FIGS. 5 to 10 are only embodiments on non-standard communication using "disk io" (read request or write request). At least one example embodiment of the inventive concepts may form a file set channel via a variety of methods of read or write requests or a combination thereof and transmits and receive file set signaling. Meanwhile, the file set signaling of at least one example embodiment of the inventive concepts may be named "cluster set signaling" or "sector set signaling" according to a unit where a bit is transferred.

Figure 11:
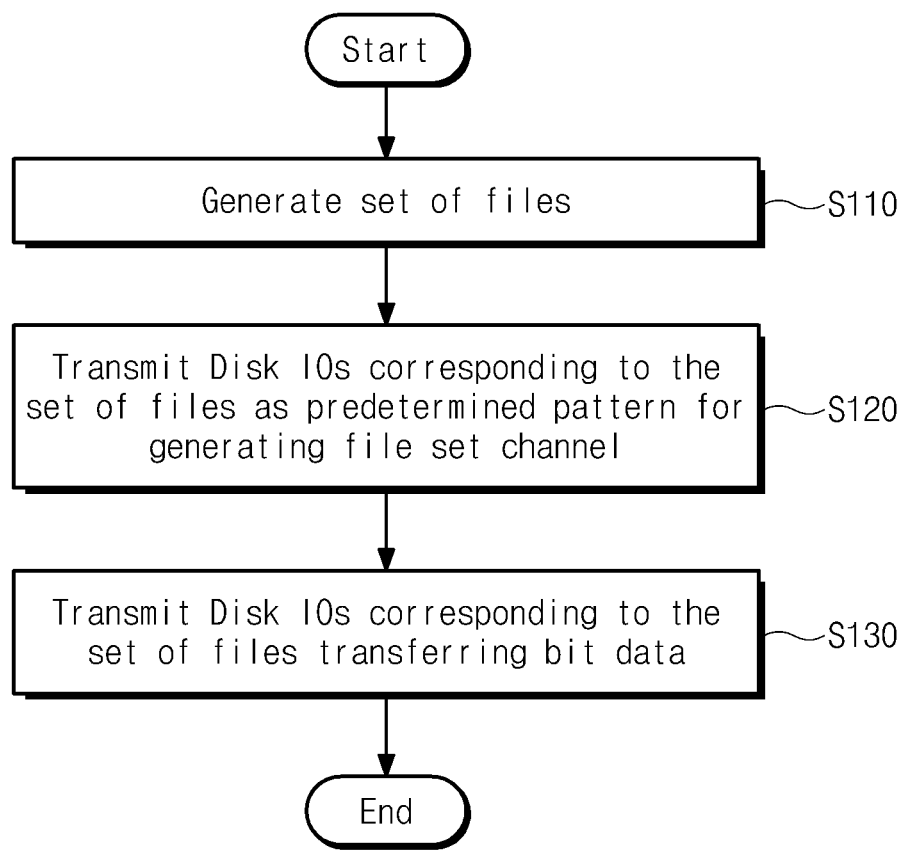
FIG. 11 is a flow chart schematically illustrating a non-standard communication of a host, according to at least one example embodiment of the inventive concepts.

FIG. 11 is a flow chart schematically illustrating a non-standard communication of a host, according to at least one example embodiment of the inventive concepts. Now will be described a non-standard communication method with reference to FIGS. 1 to 11.

An application 220 of a host 200 requests generation of a plurality of files to a file system 210 if non-standard communication between the host 200 and a storage device 100 is required. In step S110, the file system 210 of the host 200 generates a set of files in response to a request of the application 220.

In step S120, the host 200 transmits a predetermined or, alternatively, desired pattern of input/output requests corresponding to the set of files to generate a file set channel. Here, the input/output requests may be formed of write or read requests. The file set channel is formed if the storage device 100 recognizes the predetermined or, alternatively, desired pattern of input/output requests transmitted from the host 200.

After generation of the file set channel, in step S130, the host 200 transmits to the storage device 100 the input/output requests corresponding to the set of files to transfer bit data. Each of the input/output requests corresponding to the set of files may be viewed as at least one bit to be transmitted. Step S130 may be iterated to transfer bit data after generation of the file set channel.

A non-standard communication method according to at least one example embodiment of the inventive concepts may transmit bit data using input/output requests corresponding to a set of files.

Figure 12:
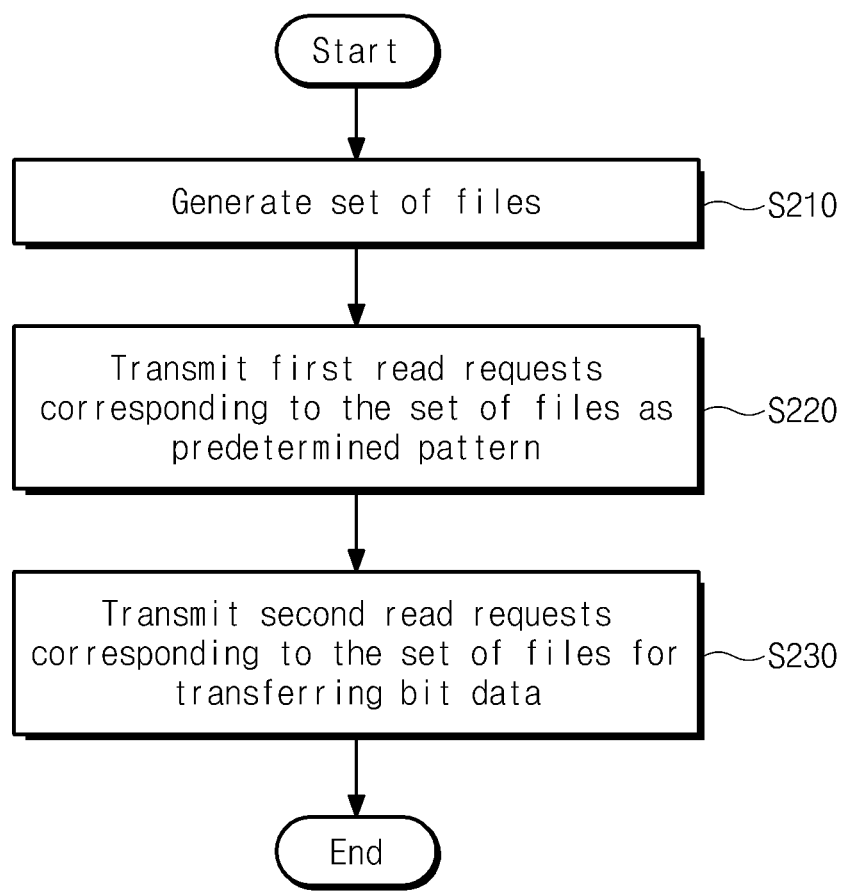
FIG. 12 is a flow chart schematically illustrating a non-standard communication of a host, according to one or more example embodiments of the inventive concepts.

FIG. 12 is a flow chart schematically illustrating a non-standard communication of a host, according to one or more example embodiments of the inventive concepts. Now will be described a non-standard communication method with reference to FIGS. 1 to 10 and 12.

A host 200 generates a set of files for non-standard communication (S210). Afterwards, the host 200 transmits a predetermined or, alternatively, desired pattern of input/output requests corresponding to the set of files to generate a file set channel. The file set channel is formed if a storage device 100 recognizes the predetermined or, alternatively, desired pattern of read requests transmitted from the host 200 (S220). After generation of the file set channel, the host 200 transmits to the storage device 100 the read requests corresponding to the set of files to transfer bit data (S230). Each of the read requests corresponding to the set of files may be viewed as at least one bit to be transmitted. Step S230 may be iterated to transfer bit data after generation of the file set channel.

A non-standard communication method according to at least one example embodiment of the inventive concepts may transmit bit data using read corresponding to a set of files.

Figure 13:
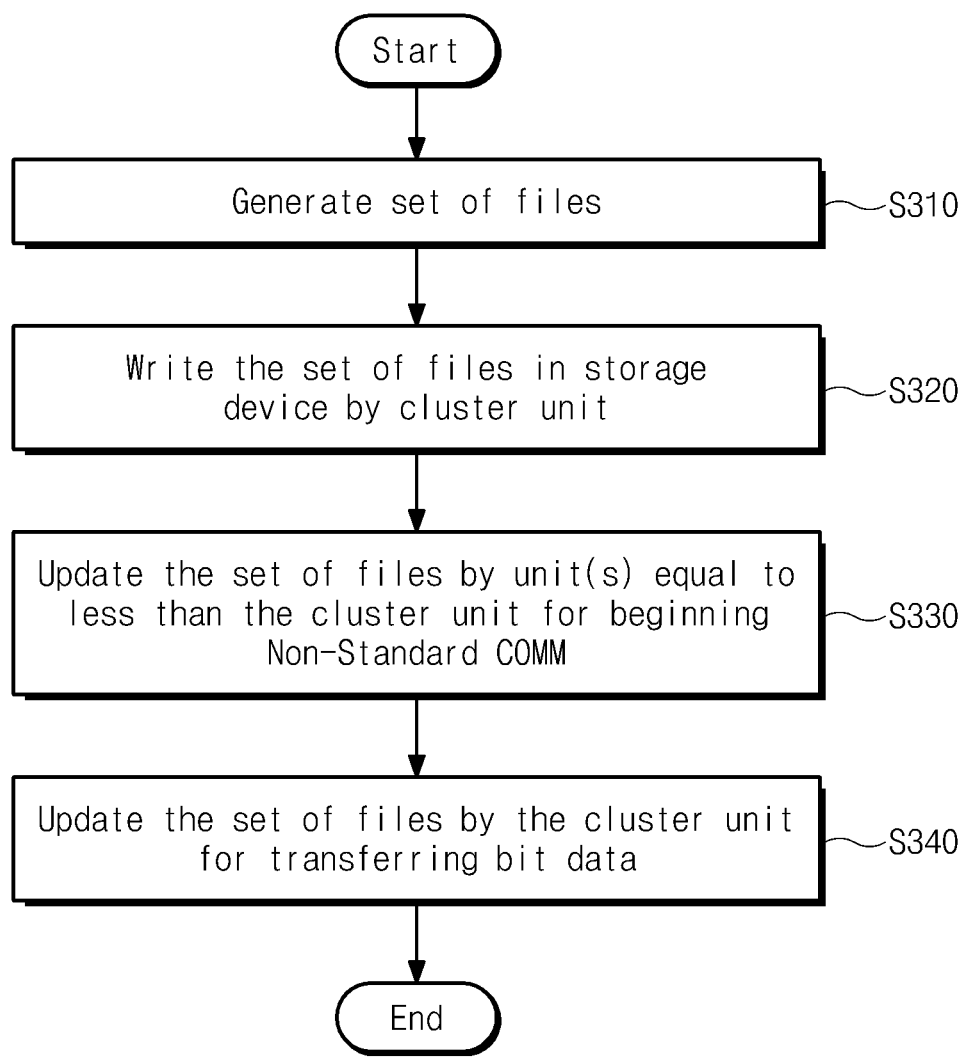
FIG. 13 is a flow chart schematically illustrating a non-standard communication of a host, according to one or more example embodiments of the inventive concepts.

FIG. 13 is a flow chart schematically illustrating a non-standard communication of a host, according to one or more example embodiments of the inventive concepts. Now will be described a non-standard communication method with reference to FIGS. 1 to 10 and 13.

A host 200 generates a set of files for non-standard communication (S310). A set of files may be written at a storage device 100 by the cluster (S320); therefore, the host 200 and the storage device 100 recognize logical addresses on the set of files. Afterwards, the host 200 transmits a predetermined or, alternatively, desired pattern of update (or, write) requests corresponding to the set of files to generate a file set channel (S330). The file set channel is formed if the storage device 100 recognizes the predetermined or, alternatively, desired pattern of update requests transmitted from the host 200 (S330). After generation of the file set channel, the host 200 transmits to the storage device 100 the update requests corresponding to the set of files to transfer bit data (S340). Each of the update requests corresponding to the set of files may be viewed as at least one bit to be transmitted. Step S340 may be iterated to transfer bit data after generation of the file set channel.

A non-standard communication method according to at least one example embodiment of the inventive concepts may transmit bit data using write corresponding to a set of files.

Figure 14:
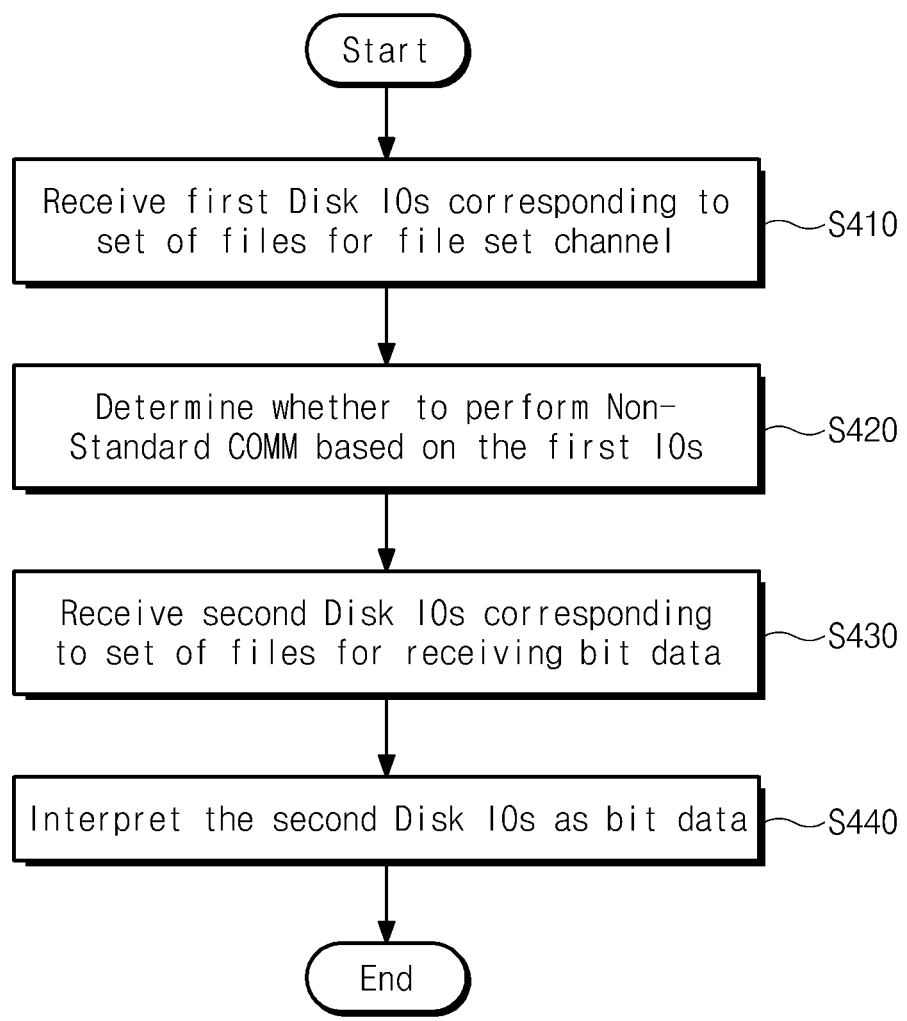
FIG. 14 is a flow chart schematically illustrating a non-standard communication of a storage device, according to at least one example embodiment of the inventive concepts.

FIG. 14 is a flow chart schematically illustrating a non-standard communication of a storage device, according to at least one example embodiment of the inventive concepts. Now will be described a non-standard communication method with reference to FIGS. 1 to 10 and 14.

A storage device 100 receives first input/output requests corresponding to a set of files for a file set channel (S410). The storage device 100 determines whether a pattern of the first input/output requests is a predetermined or, alternatively, desired pattern (S420). The storage device 100 determines execution of non-standard communication if the first input/output requests having the predetermined or, alternatively, desired pattern are received. At this time a file set channel for the non-standard communication may be formed.

Afterwards, the storage device 100 receives second input/output requests corresponding to a set of files to receive bit data via file set signaling (S430). The storage device 100 interprets the second input/output requests received via the file set channel as bit data transmitted from a host 200 (S440).

A non-standard communication according to at least one example embodiment of the inventive concepts may receive bit data based on input/output requests corresponding to a set of files.

FIGS. 12 and 14 describe a non-standard communication method using file set signaling. The non-standard communication method of at least one example embodiment of the inventive concepts may be used to issue a vendor command.

Figure 15:
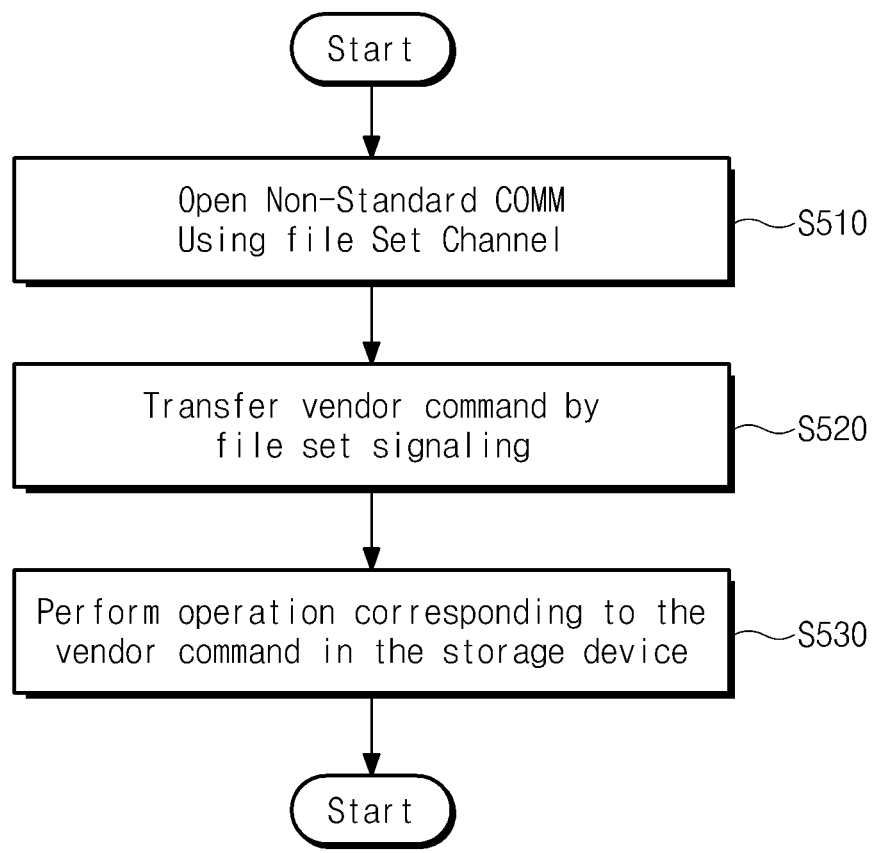
FIG. 15 is a flow chart schematically illustrating a method of executing a vendor command using file set signaling, according to at least one example embodiment of the inventive concepts.

FIG. 15 is a flow chart schematically illustrating a method of executing a vendor command using file set signaling, according to at least one example embodiment of the inventive concepts. Now will be described a method of executing a vendor command with reference to FIGS. 1 to 15. A non-standard communication channel between a storage device 100 and a host 200 is opened using a file set channel (S510). The host 200 issues a vendor command for management of the storage device 100, and transmits the vendor command to the storage device 100 via file set signaling (S520). The storage device 100 parses the vendor command transferred via the file set signaling to execute an operation corresponding to the parsed vendor command (S530). After an operation on the vendor command is ended, the storage device 100 provides the host 200 with vendor command complete information via the file set signaling.

A vendor command may be, for example, a command that is specific to a particular vendor or model of the host 200 and/or the storage device 100.

A vendor command executing method according to at least one example embodiment of the inventive concepts may transmit a vendor command for file set signaling.

Examples of devices according to one or more example embodiments of the inventive concepts will now be discussed below. One or more example embodiments of the inventive concepts are applicable to any electronic device using a micro SD card.

Figure 16:
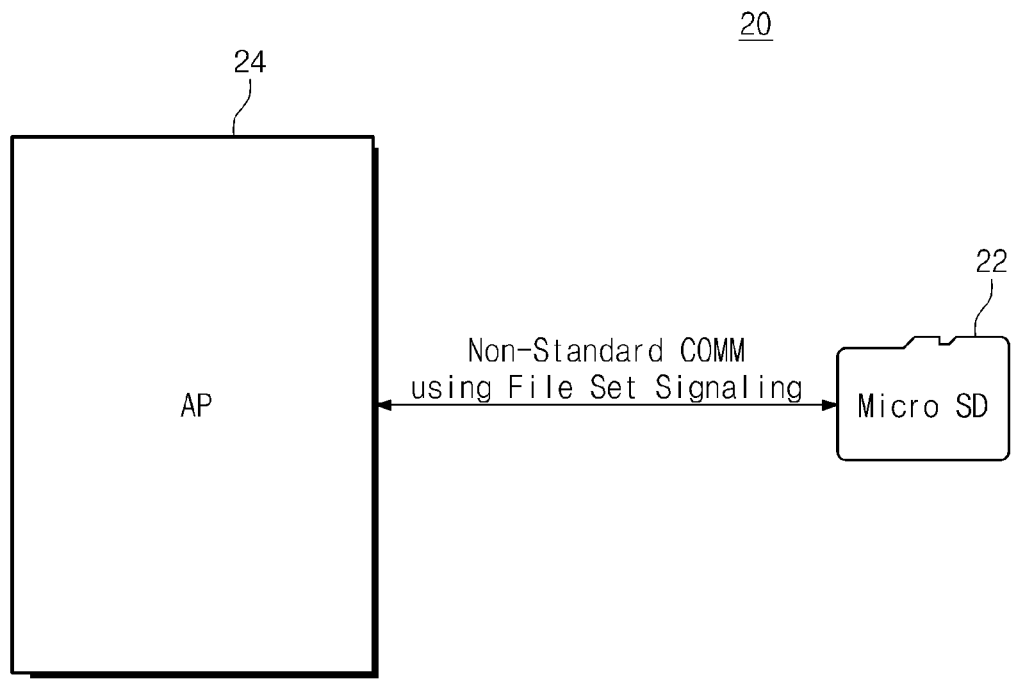
FIG. 16 is a block diagram schematically illustrating a mobile device according to at least one example embodiment of the inventive concepts.

FIG. 16 is a block diagram schematically illustrating a mobile device 20 according to at least one example embodiment of the inventive concepts. Referring to FIG. 16, a mobile device 20 incorporates an application processor 24 that is configured such that a micro SD card 22 is embedded or inserted. Here, the micro SD card 22 is formed of a storage device 100 shown in FIG. 1, and the application processor 24 is formed of a host 200 shown in FIG. 1. Non-standard communication between the micro SD card 22 and the application processor 24 may be effectuated using file set signaling.

An operating system installed on a general mobile device does not grant a root authority to an application. In this case, the application may not issue a command for executing firmware update, even though a memory card (e.g., SD card, micro SD card, MMC, eMMC, etc.) has a firmware update function.

In contrast, the mobile device 20 according to at least one example embodiment of the inventive concepts performs firmware update on the micro SD card 22 without restriction because it effectuates non-standard communication using file set signaling, based on a normal input/output request.

One or more example embodiments of the inventive concepts are applicable to an electronic device that recognizes Universal Flash Storage (UFS).

Figure 17:
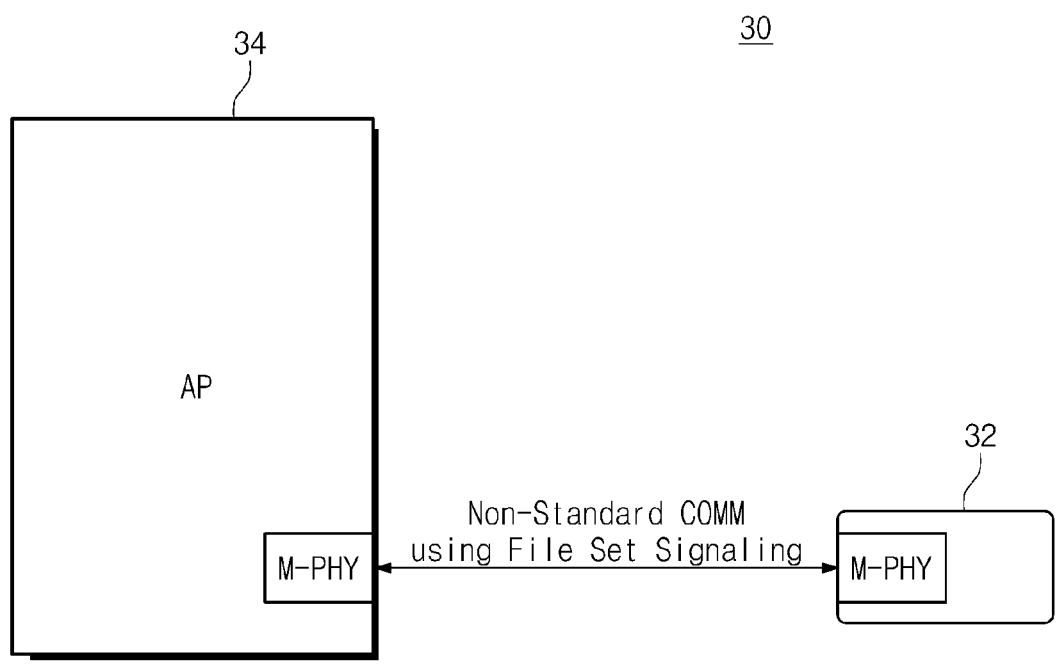
FIG. 17 is a block diagram schematically illustrating a mobile device according to one or more example embodiments of the inventive concepts.

FIG. 17 is a block diagram schematically illustrating a mobile device according to one or more example embodiments of the inventive concepts. Referring to FIG. 17, a mobile device 30 incorporates at least one UFS device 32 and an application processor 34. Here, the UFS device 32 is formed of a storage device 100 shown in FIG. 1, and the application processor 34 is formed of a host 200 shown in FIG. 1. Each of the UFS device 32 and the application processor 34 includes a mobile physical layer M-PHY for non-standard communication. Non-standard communication between the UFS device 32 and the application processor 34 is effectuated using file set signaling.

The mobile device 30 according to at least one example embodiment of the inventive concepts manages the UFS device 32 via non-standard communication using file set signaling without communication restriction.

One or more example embodiments of the inventive concepts are applicable to an electronic device that uses a main memory.

Figure 18:
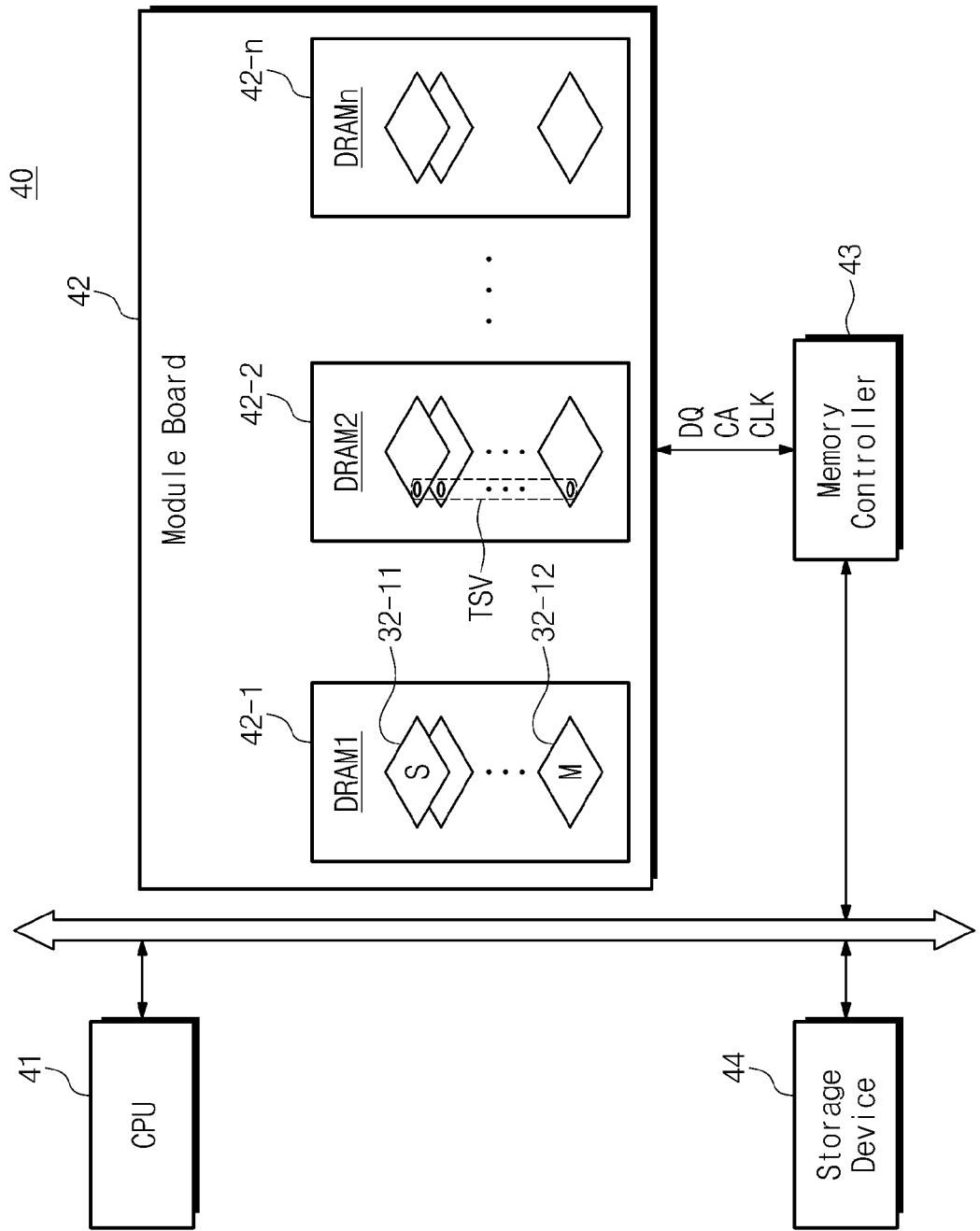
FIG. 18 is a block diagram schematically illustrating a computing system according to at least one example embodiment of the inventive concepts.

FIG. 18 is a block diagram schematically illustrating a computing system 40 according to at least one example embodiment of the inventive concepts. Referring to FIG. 18, a computing system 40 includes a central processing unit 41, a memory module 42, a memory controller 43, and a storage device 44. The central processing unit 41 controls an overall operation of the computing system 40. The memory module 42 is formed of a plurality of memory chips 41-1 to 42-*n*. As illustrated in FIG. 18, each of the memory chips 41-1 to 42-*n* is configured to have a structure where a plurality of DRAM (or PRAM) chips are stacked. Here, each of the plurality of DRAM chips may encompass at least one master chip M and at least one slave chip S.

The at least one master chip M and the at least one slave chip S may transmit and receive signals via through silicon via (TSV). The master chip may exchange a clock signal CLK, a command/address signal CA, and data DQ with the memory controller 43. The master chip may transfer a signal from an external device to the slave chip via TSV or provide the memory controller 43 with a signal output from the slave chip.

The central processing unit 41 and the memory controller 43 are configured to effectuate non-standard communication using file set signaling according to at least one example embodiment of the inventive concepts. For example, the central processing unit 41 may have the structure and operation described above with respect to FIGS. 1-15 for the host 200, and the storage device 44 may have the structure and operation described above with respect to FIGS. 1-15 for the data storage device 100.

One or more example embodiments of the inventive concepts are applicable to a solid state drive (SSD).

Figure 19:
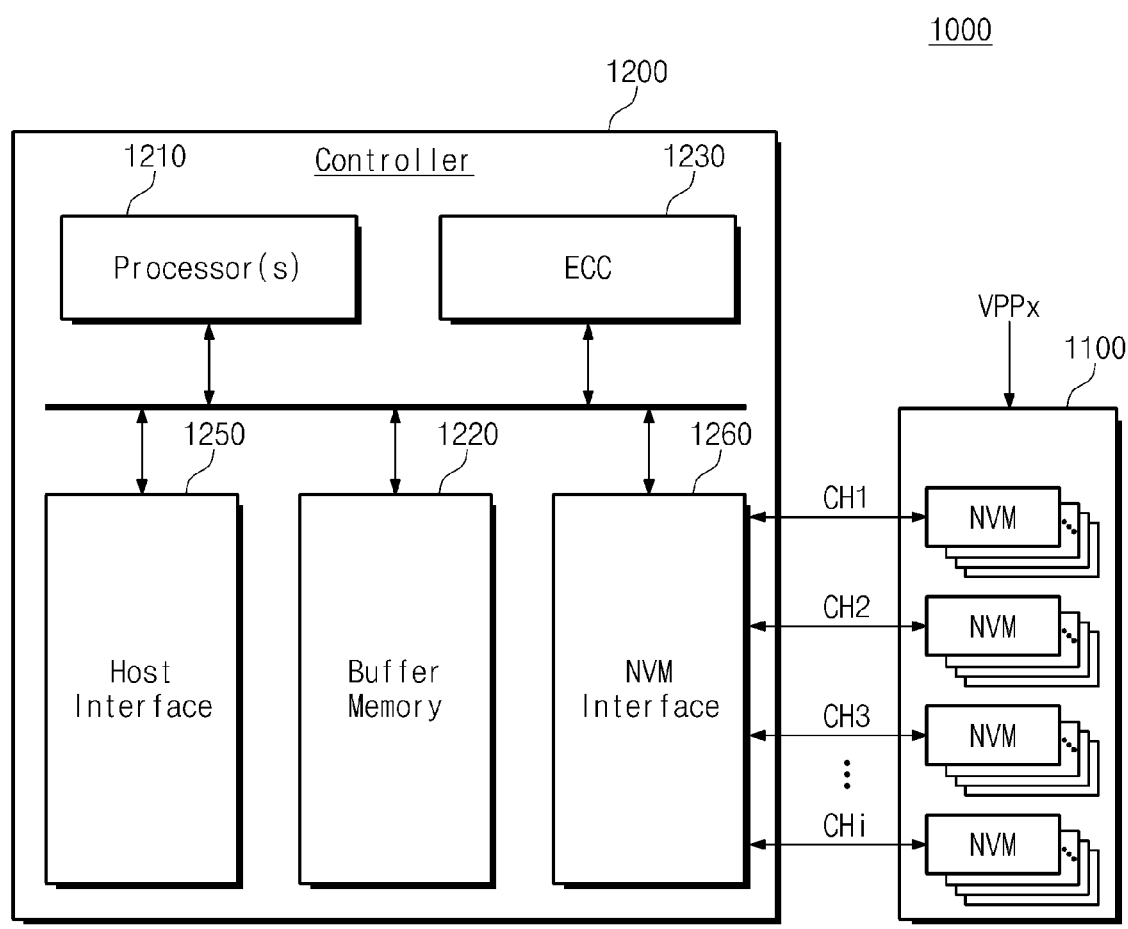
FIG. 19 is a block diagram schematically illustrating a solid state drive according to at least one example embodiment of the inventive concepts.

FIG. 19 is a block diagram schematically illustrating a solid state drive according to at least one example embodiment of the inventive concepts. Referring to FIG. 17, a solid state drive (hereinafter, referred to as SSD) 1000 includes a plurality of nonvolatile memory devices 1100 and an SSD controller 1200.

Each of the nonvolatile memory devices 1100 may be a NAND flash memory, a vertical NAND flash memory (VNAND), a NOR flash memory, a resistive RAM (RRAM), a phase-change RAM (PRAM), a magnetoresistive RAM (MRAM), an STT-RAM (Spin Transfer Torque Random Access Memory), or the like. Also, each of the nonvolatile memory devices 1100 may be implemented to have a three-dimensional array structure. The inventive concepts are applicable to not only a flash memory device where a charge storage layer is formed of a floating gate, but also a charge trap flash (CTF) memory where a charge storage layer is formed of an insulation film.

The nonvolatile memory devices 1100 are implemented to be provided with an external high voltage VPPx optionally. The SSD controller 1200 is connected to the nonvolatile memory devices 1100 through a plurality of channels CH1 to CHi (i being an integer of 2 or more). The SSD controller 1200 includes one or more processors 1110, a buffer memory 1220, an ECC block 1230, a host interface 1250, and a nonvolatile memory interface 1260. The SSD controller 1200 is configured to perform non-standard communication using file set signaling with an external host.

The buffer memory 1220 stores data needed to drive the SSD controller 1200. According to one or more example embodiments of the inventive concepts, the buffer memory 1220 may include a plurality of memory lines each of which stores data or a command. In FIG. 19 the buffer memory 1220 is illustrated as being included in the SSD controller 1200. However, one or more example embodiments of the inventive concepts are not limited thereto. The buffer memory 1220 may be placed outside of the SSD controller 1200. The ECC block 1230 is configured to correct an error of data used at an input/output operation. Although not shown in FIG. 19, a code memory may be further included to store code data needed to drive the SSD controller 1200. The code memory may be implemented with a nonvolatile memory device.

The host interface 1250 provides an interface with an external device. The nonvolatile memory interface 1260 provides an interface with the nonvolatile memory devices 1100.

The SSD 1000 according to at least one example embodiment of the inventive concepts may effectuate non-standard communication without restriction of the host, for example, in the manner described above with respect to FIGS. 1-15.

One or more example embodiments of the inventive concepts are applicable to an eMMC (e.g., an embedded multimedia card, moviNAND, iNAND, etc.).

Figure 20:
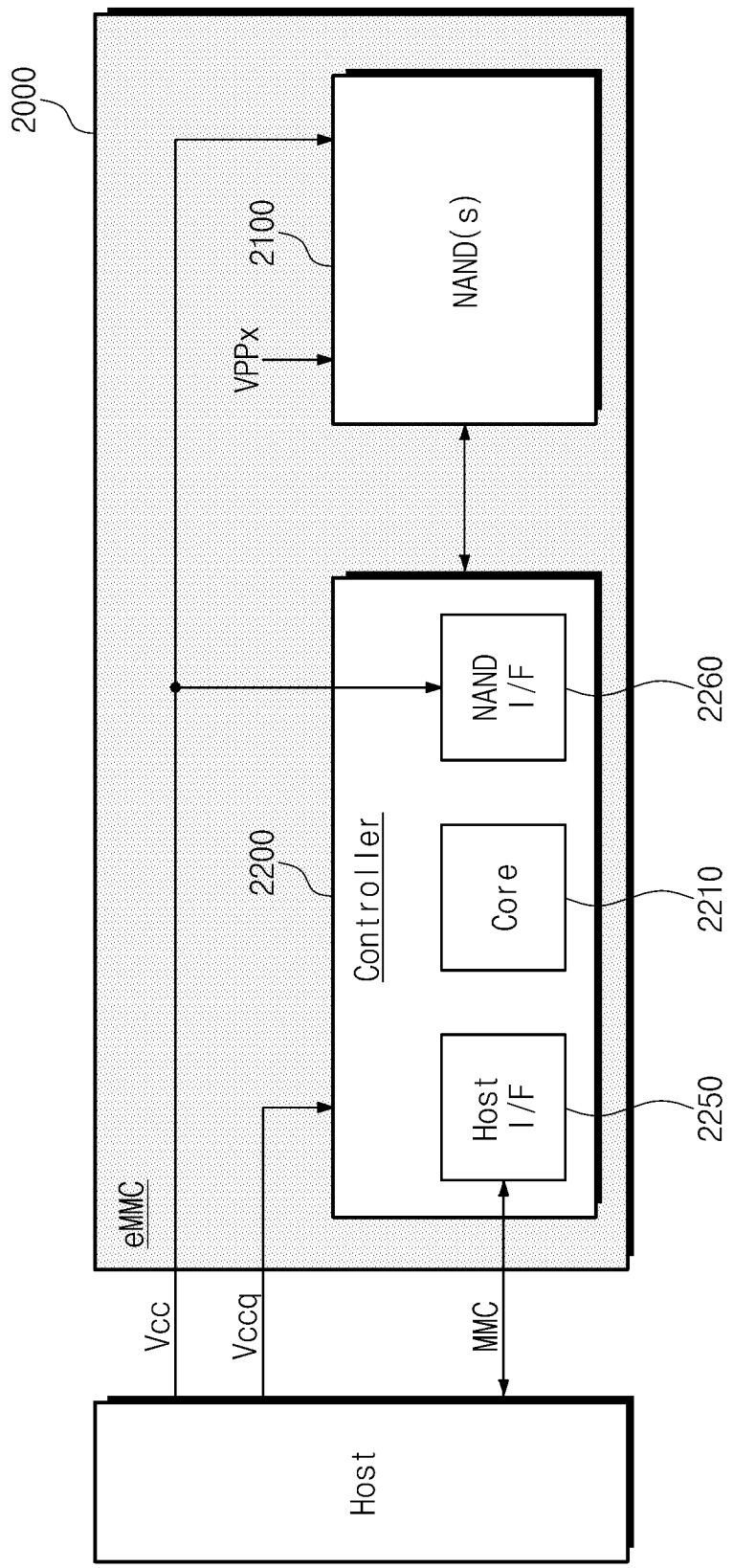
FIG. 20 is a block diagram schematically illustrating an eMMC according to at least one example embodiment of the inventive concepts.

FIG. 20 is a block diagram schematically illustrating an eMMC according to at least one example embodiment of the inventive concepts. Referring to FIG. 20, an eMMC 2000 includes one or more NAND flash memory devices 2100 and a controller 2200.

The NAND flash memory device 2100 is a single data rate (SDR) NAND flash memory device or a double data rate (DDR) NAND flash memory device. Or, the NAND flash memory device 2100 is a vertical NAND flash memory device (VNAND).

The controller 2200 is connected to the NAND flash memory device 2100 via a plurality of channels. The controller 2200 includes one or more controller cores 2210, a host interface 2250, and a NAND interface 2260. The controller core 2210 may control an overall operation of the eMMC 2000. The host interface 2250 is configured to perform an interface between the controller 2200 and a host. The NAND interface 2260 is configured to provide an interface between the NAND flash memory device 2100 and the controller 2200. According to one or more example embodiments of the inventive concepts, the host interface 2250 may be a parallel interface (e.g., MMC interface). According to one or more example embodiments of the inventive concepts, the host interface 2250 of the eMMC 200 may additionally, or alternatively, be a serial interface (e.g., UHS-II, UFS interface, etc.).

The controller 2200 is configured to effectuate non-standard communication using file set signaling with the host as described with reference to FIGS. 1 to 17. The controller 2200 may be implemented with at least one of a hardware configuration, and a configuration that combines hardware with software and/or firmware for non-standard communication.

The eMMC 2000 receives power supply voltages Vcc and Vccq from the host. Here, the power supply voltage Vcc (e.g., about 3.3 V) may be supplied to the NAND flash memory device 2100 and the NAND interface 2260, and the power supply voltage Vccq (e.g., about 1.8 V/3.3 V) may be supplied to the controller 2200. According to one or more example embodiments of the inventive concepts, the eMMC 2000 may be optionally supplied with an external high voltage.

The eMMC 2000 according to at least one example embodiment of the inventive concepts may effectuate non-standard communication using file set signaling according to a host request without restriction, thereby providing convenient management, for example, in the manner described above with respect to FIGS. 1-15.

One or more example embodiments of the inventive concepts are applicable to Universal Flash Storage UFS.

Figure 21:
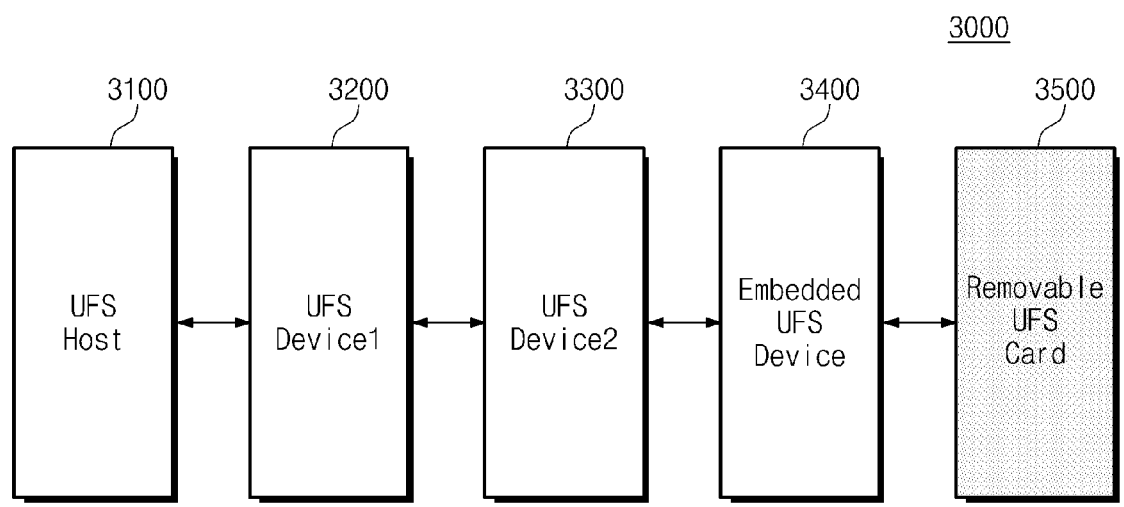
FIG. 21 is a block diagram schematically illustrating a UFS system according to at least one example embodiment of the inventive concepts.

FIG. 21 is a block diagram schematically illustrating a UFS system according to at least one example embodiment of the inventive concepts. Referring to FIG. 21, a UFS system 3000 includes a UFS host 3100, UFS devices 3200 and 3300, an embedded UFS device 3400, and a removable UFS card 3500. The UFS host 3100 may be an application processor of a mobile device. Each of the UFS host 3100, the UFS devices 3200 and 3300, the embedded UFS device 3400, and the removable UFS card 3500 may communicate with external devices through the UFS protocol. At least one of the UFS devices 3200 and 3300, the embedded UFS device 3400, and the removable UFS card 3500 may be implemented with a storage device 100 shown in FIG. 1.

Meanwhile, the embedded UFS device 3400 and the removable UFS card 3500 may perform communications using protocols different from the UFS protocol. The UFS host 3100 and the removable UFS card 3500 may communicate through various card protocols (e.g., UFDs, MMC, SD (secure digital), mini SD, Micro SD, etc.).

One or more example embodiments of the inventive concepts are applicable to a mobile device.

Figure 22:
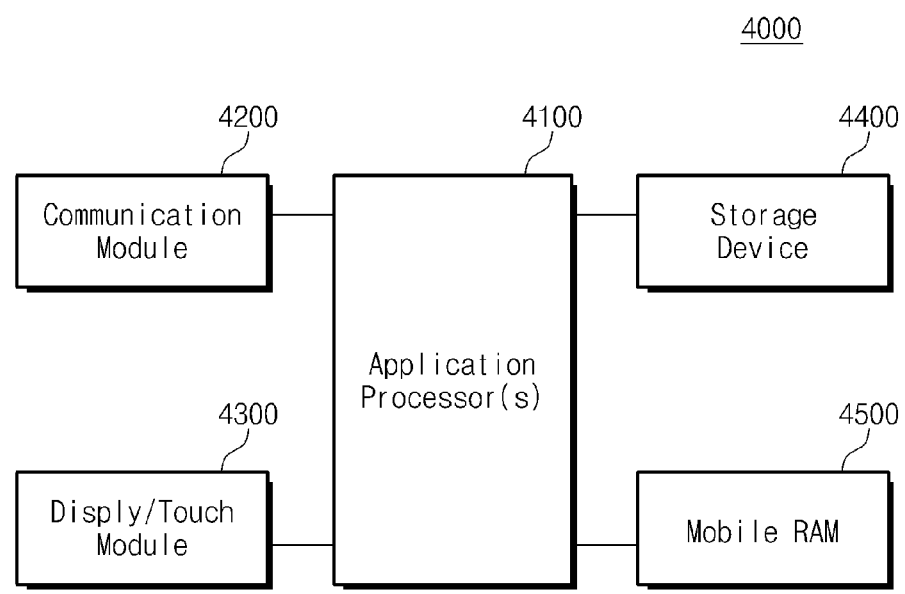
FIG. 22 is a block diagram schematically illustrating a mobile device according to at least one example embodiment of the inventive concepts.

FIG. 22 is a block diagram schematically illustrating a mobile device 4000 according to at least one example embodiment of the inventive concepts. Referring to FIG. 22, a mobile device 4000 includes an application processor 4100, a communication module 4200, a display/touch module 4300, a storage device 4400, and a mobile RAM 4500. For example, the application processor 4100 may have the structure and operation described above with respect to FIGS. 1-15 for the host 200, and the storage device 4400 may have the structure and operation described above with respect to FIGS. 1-15 for the data storage device 100.

The application processor 4100 controls an overall operation of the mobile device 4000. The application processor 4100 may be configured in the same shown in FIG. 1. The communication module 4200 is implemented to perform wireless or wire communications with an external device. The display/touch module 4300 is implemented to display data processed by the application processor 4100 or to receive data through a touch panel. The storage device 4400 is implemented to store user data. The storage device 4400 may be, but is not limited to, a memory card, an eMMC, an SSD, or an UFS device. The storage device 4400 may be implemented with a storage device 100 shown in FIG. 1.

The mobile RAM 4500 is configured to temporarily store data needed for a processing operation of the mobile device 4000.

The mobile device 4000 according to at least one example embodiment of the inventive concepts effectuates non-standard communication a file set, thereby improving system performance overall.

One or more example embodiments of inventive concepts include issuing "disk io" to effectuate non-standard communication with a storage device. One or more example embodiments of the inventive concepts may be used regardless of hardware restriction and software restriction. Here, the hardware restriction may mean what may not be defined by the standard interface communication protocol of a storage device, and the software restriction may mean the situation where the standard protocol is not used due to a lack of the authority of a running application even through the standard protocol exists.

The file set signaling method may be used under conditions: a transfer of information to a storage device from an application, acquirement of information from the storage device, a request of the application on a custom feature to the storage device.

One or more example embodiments of the inventive concepts are configured to include an application and a storage device. Here, the storage device is applicable to all storage medium capable of generating "io", such as HDD (hard disk drive), SSD (solid state drive), Flash Thumb drive, and so on. Also, if an application performs an input/output on a file using a corresponding OS file io api, a corresponding OS file system uses a characteristic of converting it into a sector address. Also, if an application directly appoints a sector address causing generation of "io" or names a sector address, such a sector address is used for non-standard communication without modification.

At least one example embodiment of the inventive concepts may provide a method capable of communicating with a storage device regardless of a type of a standardized interface of the storage device and a type of a file system installed on the storage device.

A memory system and/or a storage device according to at least one example embodiment of the inventive concepts may be packaged according to any of a variety of different packaging technologies. Examples of such packaging technologies may include PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An operation method of a storage device configured to communicate with a host, the operation method comprising:
   opening a non-standard communication channel between the storage device and the host using a file set channel;
   receiving a vendor command from the host via the file set channel, the vendor command being transmitted using first file set signaling;
   parsing the vendor command to execute an operation corresponding to the parsed vendor command; and
   providing the host with vendor command complete information using second file set signaling after ending the operation corresponding to the parsed vendor command.

2. The operation method of claim 1, wherein opening a non-standard communication channel between the storage device and the host using a file set channel comprises:
   receiving a first pattern of input/output (I/O) requests for a plurality of files from the host; and
   generating the file set channel if the first pattern of I/O requests is a predetermined pattern.

3. The operation method of claim 2, wherein the first pattern of I/O requests is one of a predetermined pattern of read requests, a predetermined pattern of write requests, or a predetermined pattern of update requests.

4. The operation method of claim 2, wherein receiving a vendor command from the host via the file set channel comprises:
   receiving a second pattern of I/O requests for first files from among the plurality of files from the host; and
   interpreting the second pattern of I/O requests received from the host as the vendor command.

5. The operation method of claim 4, wherein the second pattern of I/O requests includes requests for the first files and does not include requests for second files from among the plurality of files, each of the first files indicating a first bit value and each of the second files indicating a second bit value different from the first bit value.

6. The operation method of claim 2, wherein providing the host with vendor command complete information comprises providing information on pass/fail for request of each of the plurality of files, and
   the information on pass/fail includes the vendor command complete information.

7. The operation method of claim 1, wherein the vendor command is a command that is specific to a particular vendor or model of the host or the storage device.

8. A storage system comprising:
   a host including a processor configured to generate a plurality of files for a file set channel and transmit a first pattern of input/output (I/O) requests corresponding to the plurality of files; and
   a storage device including a non-standard communication determiner configured to recognize whether the first pattern of I/O requests from the host is a predetermined pattern,
   wherein the file set channel is formed if the first pattern is the predetermined pattern.

9. The storage system of claim 8, wherein after the file set channel is formed, the processor is configured to transmit first data bits to the storage device via the file set channel, the first data bits being transmitted using first file set signaling, the first file set signaling including a second pattern of I/O requests corresponding to first files from among the plurality of files.

10. The storage system of claim 9, wherein the non-standard communication determiner is configured to convert the second pattern of I/O requests into corresponding data bit such that each request of the second pattern represents each bit of the first data bits.

11. The storage system of claim 10, wherein the non-standard communication determiner is configured to transmit second data bits to the host via the file set channel, the second data bits being transmitted using second file set signaling, the second file set signaling including information on pass or fail for a request of each of the plurality of files.

12. The storage system of claim 9, wherein the host further comprises:
   a file system configured to convert the second pattern of I/O requests into disk I/O request; and
   a device driver configured to convert the disk I/O requests into a command which the storage device identifies.

13. The storage system of claim 12, wherein the file system comprises at least one of an application programming interface (API), a file system manager, and a device interface.

14. The storage system of claim 8, wherein the host further comprises an application, the application being a program for managing, monitoring, improving or optimizing the storage device.

15. The storage system of claim 8, wherein the host and the storage device perform non-standard communication using file set signaling.

16. A communication method of a storage system including a host and a storage device communicating with the host, the communication method comprising:
   generating, by the host, a plurality of files;
   transmitting, by the host, a first pattern of input/output (I/O) requests for the plurality of files to the storage device;
   recognizing, by the storage device, that the first pattern of I/O requests is a predetermined pattern to generate file set channel;
   transmitting, by the host, first bit data to the storage device via the file set channel, the first bit data being transmitted using first file set signaling, the first file set signaling including a second pattern of I/O requests corresponding to first files from among the plurality of files such that each file in the plurality of files represents each bit of the first bit data; and
   interpreting, by the storage device, the second pattern of I/O requests as the first bit data transmitted from the host.

17. The communication method of claim 16, wherein the first and second patterns of I/O requests include read requests.

18. The communication method of claim 17, wherein the second pattern includes read requests for first files from among the plurality of files, does not include read requests for second files from among the plurality of files, and
   each of the first files indicates a first bit value and each of the second files indicates a second bit value different from the first bit value.

19. The communication method of claim 16 further comprises:
   transmitting, by the storage device, second bit data to the host via the file set channel, the second bit data being transmitted using second file set signaling, the second file set signaling including information on pass or fail for I/O requests for the plurality of files.

20. The communication method of claim 16, further comprises:
   informing, by the storage device, the host that the file set channel is generated, after recognizing that the first pattern of I/O requests is the predetermined pattern; and
   informing, the storage device, the host that the communication is completed after interpreting the second pattern of I/O requests as the first bit data.

* * * * *